United States Patent
Cananzi

(10) Patent No.: US 11,533,196 B2
(45) Date of Patent: Dec. 20, 2022

(54) REGENERATIVE POWER-OVER-ETHERNET (POE) MID-SPAN INJECTOR

(71) Applicant: Arista Networks, Inc., Santa Clara, CA (US)

(72) Inventor: David Anthony Cananzi, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 273 days.

(21) Appl. No.: 16/994,020

(22) Filed: Aug. 14, 2020

(65) Prior Publication Data

US 2022/0052874 A1    Feb. 17, 2022

(51) Int. Cl.
*H04L 12/40* (2006.01)
*H04B 3/54* (2006.01)

(52) U.S. Cl.
CPC ......... *H04L 12/40045* (2013.01); *H04B 3/54* (2013.01); *H04L 12/40013* (2013.01); *H04L 12/40052* (2013.01)

(58) Field of Classification Search
CPC ..... H04B 3/54; H04L 12/10; H04L 12/40013; H04L 12/40045; H04L 12/40052
See application file for complete search history.

(56) References Cited

U.S. PATENT DOCUMENTS

| | | | |
|---|---|---|---|
| 7,921,308 B2* | 4/2011 | Dhuyvetter | H04L 12/10 |
| | | | 713/300 |
| 9,024,473 B2 | 5/2015 | Huff et al. | |
| 9,152,161 B2 | 10/2015 | Cerutti et al. | |
| 9,705,325 B2* | 7/2017 | Dwelley | H02J 1/102 |
| 10,063,049 B1* | 8/2018 | Gill | H02J 1/108 |
| 2007/0041568 A1* | 2/2007 | Ghoshal | H04L 12/10 |
| | | | 379/324 |

* cited by examiner

*Primary Examiner* — Terrell S Johnson
(74) *Attorney, Agent, or Firm* — Fountainhead Law Group, P.C.

(57) ABSTRACT

Systems and methods for power distribution by an ethernet controller are disclosed. A first input port receives a first power carried by a first ethernet cable and sourced by a first source PoE device. A second input port receives a second power carried by a second ethernet cable and sourced by a second source PoE device. The first input port is at a first voltage lower than a minimum voltage of a specified input voltage range and the second input port is at a second voltage lower than the minimum voltage of the specified input voltage range. A controller, coupled to the first and second input ports, substantially equalizes current flowing across a first output port and a second output port, coupled to the downstream PoE devices, such that a load, caused by the downstream PoE devices, between the first output port and the second output port is shared.

20 Claims, 11 Drawing Sheets

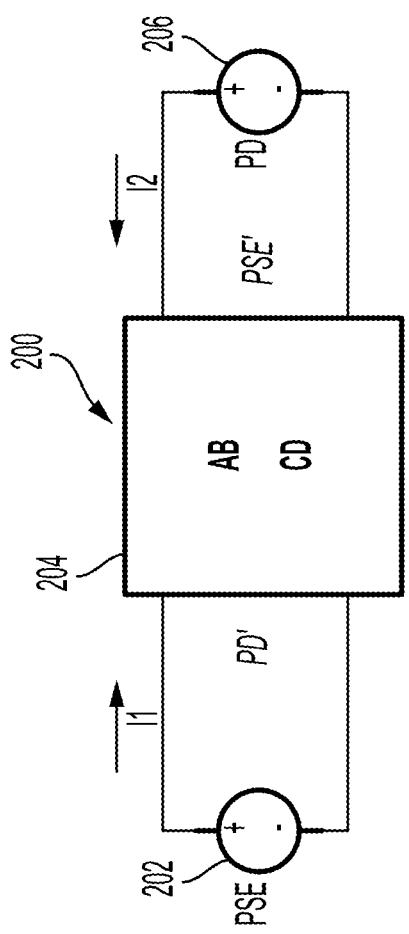
FIG. 2A
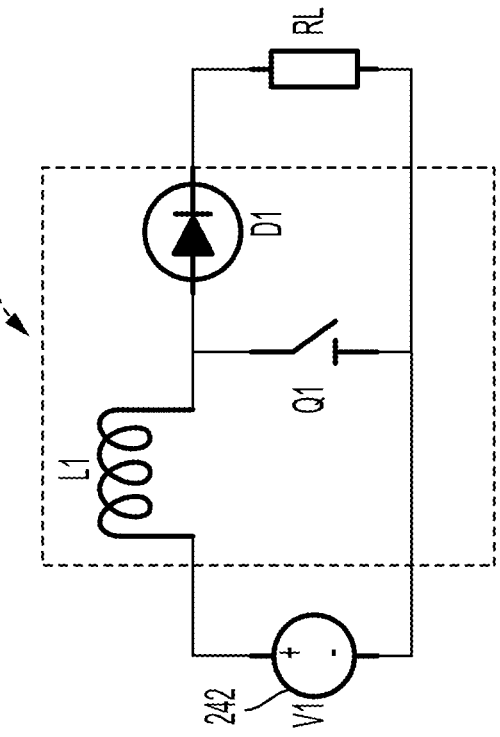
FIG. 2D
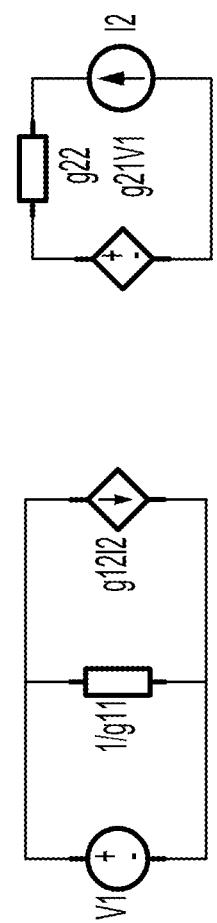
FIG. 2C
FIG. 2B

REGENERATIVE POWER-OVER-ETHERNET (POE) MID-SPAN INJECTOR

BACKGROUND

The present disclosure relates to power distribution systems.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 2A shows a conceptual diagram of a transmission parameter model of an illustrative power distribution system 200, in accordance with some embodiments of the disclosure;

FIGS. 2B and 2C show conceptual diagrams of G-equivalent circuits of the system of FIG. 2A;

FIG. 2D shows a conceptual diagram of a circuit model of the system of FIG. 2A;

DETAILED DESCRIPTION

Figure 1:
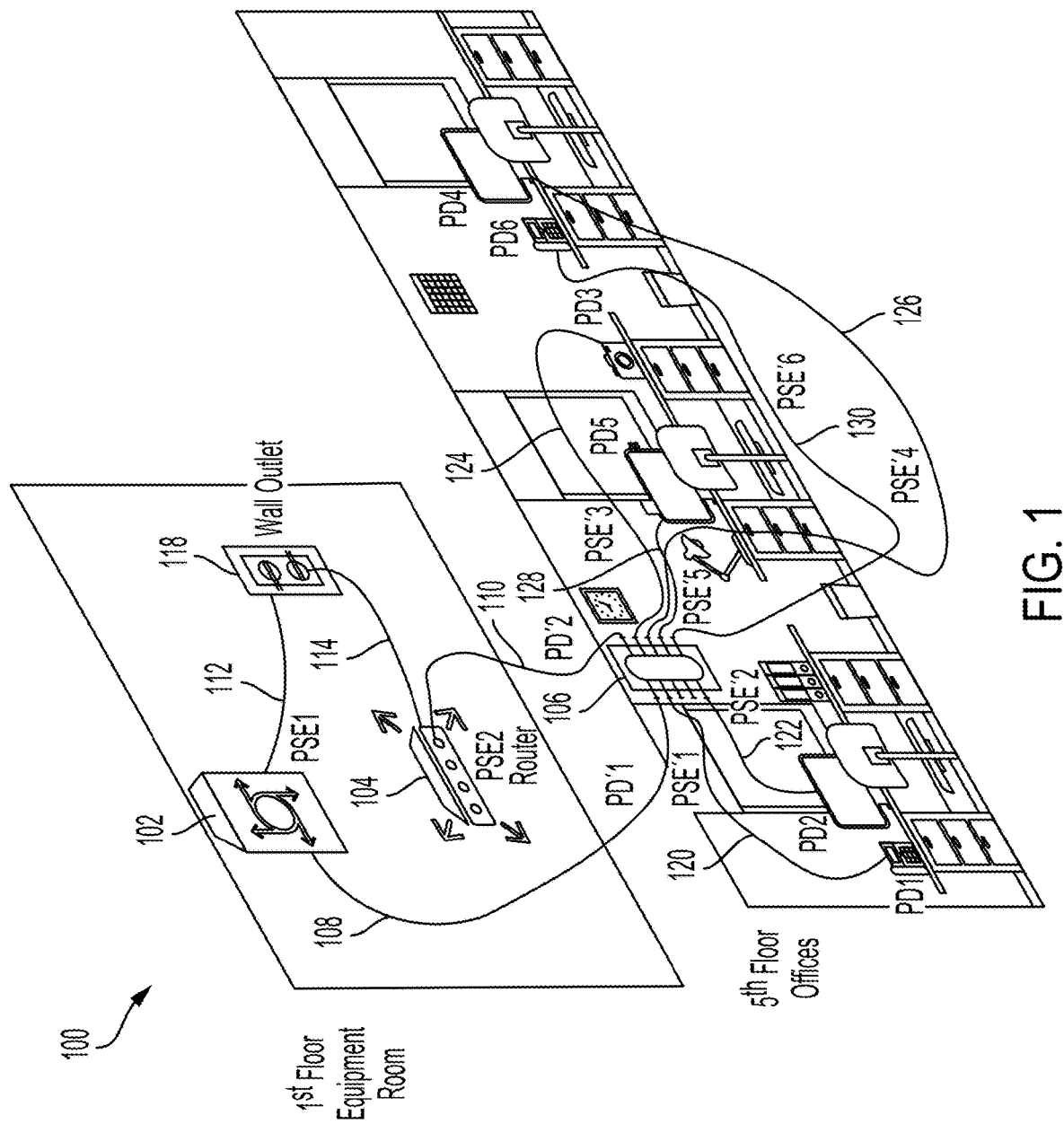
FIG. 1 shows an illustrative diagram of a power distribution system 100, in accordance with some embodiments of the disclosure.

At the bottom rung of the internet model network ladder lies the physical layer, a defined layer of network device-to-network device and even non-network device-to-network device physical Ethernet cable connections. Up through a decade past, Ethernet-ready devices required a separate (AC) power cord to successfully establish Ethernet device connections because the Ethernet cable physical construct was limited to a data-carrying feature and lacked power-carrying features. In recent past, the design of Ethernet cables has evolved into a conveniently clean single cable-packaged data and power delivery connection. The industry wide adoption of the Institute of Electrical and Electronics Engineers (IEEE) 802.3 power management standard dictates certain required specifications surrounding interactions with the single data-power carrying cable, for example, for establishing certain power-over-ethernet (PoE) device connections. IEEE 802.3 defines a standard specification for Ethernet, a method of packet-based physical communication in a local area network (LAN) maintained by the IEEE. Broadly, the IEEE 802.3 standard specifies the physical media and the operational characteristics of Ethernet.

PoE devices readily adapt to changing environments. Their plug and play nature facilitate their readiness for switch-level network-to-network movement and reconnection. Their ease of integration into changing network configurations helps avoid the hassles of bringing-down an entire network for a mere network device add or subtract accommodation. Installation of remote or outside equipment is now without the costly requirement of AC power connections and infrastructure-disrupting installations at every endpoint.

The IEEE 802.3 standard specifies two notable types of PoE devices, a power sourcing equipment (PSE) and a powered device (PD), the former device a direct current (DC)-based power source for the latter device. Each PD gains access to the network data through the same single power-carrying Ethernet cable. The PSE, an uplink (or "upstream" device), delivers power through the common Ethernet power-carrying cable to each of the Ethernet-connected DC-based power-consuming PDs, the downlinks (or "downstream" devices), based on a standardized power budget type classification. Power budget is defined as the total amount of power a device can send through an Ethernet cable. For example, to be IEEE 802.3bt compliant, a Type 3 PD is specified to consume up to 12.95 Watts (W), at 37.0-57 Volts (V), and a maximum of 350 milli Amps (mA); while a Type 3 PSE is specified to provide up to 15.4 W, at 44.0V-57.0V with a 9 W Ethernet cable power dissipation allowance.

PoE arrangements are not without problems, some of which arise, at least in part, from PSE centralization as well as the requisite multitude of cable installations. A higher power count Ethernet network switch, one with 48 Type 3 ports, for example, is expected to source 60 W of which 9 W is allowed to be lost in the PD power-connecting ethernet cable. That is, a Type 3 voltage drop is 50.0 V to 42.5 V, or 7.5 V drop proportional to a 9 W power loss (7.5V*1200 mA=9 W). But not every device connected to one of the 48 Type 3 switch ports, such as a Type 1 or a Type 2 PD, requires a Type 3 specified power output, not even the cable-related power-dissipated power output. For instance, a voice-over-internet protocol (VoIP) telephone, a Type 1 device, may consume 5 W in the average, or less than two times the 12.5 W Type 3 classification power budget, a power budget inefficiency.

Current PoE pass-through circuits distribute power from an upstream device through a pass-through device delivering a single-cabled data and power connection to downstream PDs. But a greater number of PDs requires a greater number of connecting Ethernet cables and with each Ethernet cable, the connection realizes a voltage drop driving the PD input to less than a minimum voltage of an IEEE 802.3-specified input voltage range, a noncompliant PoE device requirement. The voltage drop penalty can further be a gating item to maximizing Ethernet cable length, the number of downstream PDs, or both.

The inconvenience and expense associated with cable installation and a cable web further underscore the shortfalls of the current PoE power distribution techniques. In an example scenario of a PSE centralized system, the PSE may be located in a designated area of a single office floor for distributing power to PoE devices located in multiple other floors with Ethernet cables requiring stringing from floor-to-floor for installation and connection at each PoE. Each installation may require costly infrastructure reconstruction.

An Ethernet-ready switch of some of the embodiments disclosed herein collects PSE power from one or more corresponding PSEs possibly at varying locations and distributes the collected PSE power to corresponding Ethernet-connected PDs. In contrast to current PoE power distribution schemes, the main power (PSE-collected power) is budgeted judiciously among various ports for connection to low-voltage requiring PDs. In some embodiments, the main power may be initially disbursed among multiple locations and collected at the switch. The switch fans out the collected power to the lower-powered ports in a manner maximizing the number of PDs. Each PD is supplied with sufficient input voltage to meet standard-defined input voltage levels of every classification type. The system may further maximize the specified length of the Ethernet cable connecting the switch to a PD, effectively extending the power sourced from one or more PSEs through a maximized cable length and to a maximum number of sourced PDs. In some cases, despite cable connection power loss between uplink PSEs and downlink PDs, power supplied to the downlink PDs by the uplink PSEs meet even the minimal power type-based input voltage IEEE 802.3 standard requirements.

In accordance with various disclosed embodiments, a switch includes a first switch port and a second switch port. The switch receives, at the first switch port, a first ethernet cable carrying a first power sourced from a first PoE device for a second PoE device requiring a second power. The first PoE device is coupled to the second PoE device through the first ethernet cable, the switch is coupled to the second PoE device at the first switch port and the switch is further coupled to a set of downstream PoE devices at the second switch port. The first power is higher than the second power, and the first power is at a specified output voltage range and the second power is at a specified input voltage range. A minimum voltage of the specified output voltage range is less than a minimum voltage of the specified input voltage range at the first switch port at least in part due to a voltage drop across the first ethernet cable. The switch raises a voltage at the first switch port by a voltage amount at least equal to the minimum voltage of the specified input voltage range at the second switch port. The first PoE device may be a PSE, the second PoE device may be a PD device, and the set of downstream PoE devices may be a set of respective PDs, all in accordance with the IEEE 802.3 standard. In some embodiments, a power type of the first PoE device is a higher class than a power type of each PoE device of the set of downstream PoE devices. Each PoE device of the set of downstream PoE devices may be coupled to the second switch port through a second Ethernet cable extending an entire specified Ethernet cable length between a corresponding PoE device and the second switch port.

In some cases, the switch may be coupled between more than one PSE device and a set of downstream PoE devices where each PSE device is of an associated power type, specified by the IEEE 802.3 standard, higher than the power type of the downstream PoE devices, also specified by the IEEE 802.3 standard. A PoE device of a particular power type is associated with a corresponding standard-specified voltage range. For example, the PSEs may be associated with a standard-specified output (DC) voltage range and the downstream PoE devices, the PDs, may be associated with a different standard-specified input (DC) voltage range. The specified output voltage range may not be met at the switch input ports due to cable-related voltage drops electrically coupling respective PSEs and corresponding switch input ports. The switch device combines the PSE output voltages at the switch input ports, each input port receiving a respective ethernet cable coupled to a respective PSE. The ethernet cable carries power in conformance with the IEEE power type standard. In some embodiments, the switch boosts the combined voltages to a voltage level sufficient to meet each PD at a minimum input voltage requirement of a corresponding specified input voltage range despite the length of the ethernet cable. In some embodiments, the load realized from the PDs is balanced between sourcing PSEs by the intervening switch coupling the PSEs to the PDs.

In accordance with some disclosed embodiments, an ethernet switch includes a first input port coupled to receive a first ethernet cable carrying a first power sourced by a first source PoE device and a second input port coupled to receive a second ethernet cable carrying a power sourced by a second source PoE device. The first input port is at a first voltage lower than a minimum voltage of a specified input voltage range and the second input port is at a second voltage lower than the minimum voltage of the specified input voltage range, and the first voltage is different than the second voltage. The ethernet switch further includes a first output port coupled to a set of downstream PoE devices and a second output port coupled to the set of downstream PoE devices. The ethernet switch regulates the first voltage and the second voltage to a substantially equal voltage and raises the substantially equal voltage to at least the minimum voltage of the specified input voltage range at the first output port and the second output port. The first source PoE device may be a PSE and the second source PoE device may be another PSE, both PSEs may be IEEE 802.3 standard-compliant PSEs. Each of the set of downstream devices may be a PD device.

The switch may boost the voltage of the power received from a higher type uplink device at a receiving end of the Ethernet cable with a power dissipating voltage drop. The switch may then redistribute the power at the new boosted voltage to the set of downstream devices through a maximized cable length coupling to the lower type downlink devices while meeting the IEEE standards with compliance.

In various illustrated embodiments and related descriptions, an active pass-through circuit serves as an intermediary device between an upstream high power PoE source device coupled to the active pass-through circuit through an ethernet cable carrying data and power and one or more low powered PDs coupled to the active pass-through circuit through different ethernet cables. In some cases, the circuit behaves as a regenerative mid-span injector boosting the output voltage of the high power PoE source device minus an ethernet cable-based voltage drop, to meet the IEEE 802.3 input voltage range standards for downstream devices, such as the low powered PDs. The circuit effectively redistributes the power at a new voltage to the low powered PDs allowing for a maximum specified ethernet cable length between the circuit and the upstream PoE devices and the circuit and the downstream PoE devices. In some embodiments, the circuit includes one or more voltage regulators to maintain the new voltage at a level acceptable by the IEEE standard for all power type devices. The efficiency of the voltage regulator may be factored into the ethernet cable-based power loss. After the voltage boost, power is distributed to the downstream PDs at the new voltage allowing for a voltage drop amount proportional to the maximum allowable length of the ethernet cables coupling the circuit to the PDs and in some cases coupling the PDs to additional downstream PoE devices. In some cases, the voltage boost causes excess power relative to the power specified by the IEEE standard at the PDs and the excess power is efficiently shared among the PDs using a circuit load sharing feature.

FIG. 1 shows a conceptual diagram of an illustrative power distribution system, in accordance with an embodiment of the disclosure. In FIG. 1, a power distribution system 100 is shown to include a server 102 and a router 104, both powered by a standard alternating current (AC) power at a standard wall outlet 118 of an equipment room. System 100 is further shown to include an ethernet switch 106 distributing power to powered devices (PDs) PD1-PD6, in accordance with an embodiment of the disclosure.

FIG. 1 is an example application of an ethernet switch to which power is distributed by one or more power sourcing equipment (PSEs) devices and which fans out the distributed power to downstream power-over-Ethernet (PoE) devices. For example, server 102 and router 104 are each example PSE devices distributing power to switch 106 and switch 106 is an example ethernet switch providing power to each of PD1-PD6, example downstream PoE devices. Each of the server 102, router 104, switch 106, and PD1-PD6 may be configured as a PoE device in compliance with the industry-adopted IEEE 802.3 standard, as further discussed above and below. For example, these devices may be specifically compliant with the IEEE 802.3af/at standards, each a power Type 1, Type 2, Type 3, or Type 4 device. It is understood that each of server 102 (PSE1) and router 104 (PSE2), is an example PSE device and that other PSE device types are contemplated. For example, PSE1 and PSE2 may each be an internet protocol (IP) printer or PSE1 may be a network switch and PSE2 may be an IP printer. Furthermore, while two PSE devices are shown in the embodiment of FIG. 1, a different number of PSE devices may be employed. For example, system 100 may include one PSE device (PSE1 or PSE2) or more than two PSE devices. Analogously, while system 100 is shown to include six downstream PoE devices, PD1-PD6, a different number of downstream PoE devices may be employed with each having power requirements adequately served by PSE1 and PSE2 for proper operation. In the embodiment of FIG. 1, for the purpose of illustration, PSE1 and PSE2 are each presumed configured as a device in conformance with the IEEE 802.3bt standard for sourcing power exceeding the input power specification of a PD to which each of PSE1 and PSE2 is to provide power in accordance with the IEEE 802.3bt standard. For example, PSE1 and PSE2 may be an upstream (power source) PoE devices of Type 3, Type 4, or a combination, for providing power to one or more downstream PoE devices, each of a Type 1 or a Type 2 device. In some embodiments, one or more of the downstream PoE devices to which PSE1 and PSE2 provide power may themselves serve as PSEs to additional downstream PoE devices not shown in FIG. 1.

In the embodiment of FIG. 1, PSE1 is shown coupled to switch 106 through an ethernet cable 108 carrying data and power from PSE1 to switch 106 and PSE2 is shown coupled to switch 106 through an ethernet cable 110 carrying data and power from PSE2 to switch 106. In each case, to account for a voltage drop through the ethernet cable, the source voltage (PSE1 output voltage or PSE2 output voltage) needs to be greater than the device voltage (the input voltage of a PD connected to a corresponding source PSE). In this manner, PSE1 and PSE2 serve as the power source to switch 106, a device powered by PSE1 and PSE2. PSE1 and PSE2 are each shown coupled to receive AC power from wall outlet 118. In some embodiments, each of PSE1 and PSE2 may itself serve as a downstream PoE device to a source PoE device (not shown), and therefore not connected to AC power (e.g., power from wall outlet 118) and instead connected to a sourcing PoE device. Switch 106 is shown coupled to each of PD1-PD6 through a respective ethernet cable 120-130. Each of PD1-PD6 may be of a different or a common power type. For the power constraint reasons presented above regarding uplinks and downlinks, a Type 1 device, serving as a downstream PD, such as PD3 (e.g., a camera), requires at least one of the PSE1 and PSE2 devices to be of a Type 4 device. In the example of FIG. 1, each of PD1 and PD6 is a voice-over-IP (VoIP) device, a Type 1 device; each of PD2, PD4, and PD5 is a Type 3 desktop computer and PD3 is a camera, a Type 1 device. Accordingly, pursuant to the IEEE 802.3at/af/bt standards, each of PD1 and PD6 has the following requirements as a PD:

12.95 Watts (W) (max) at 37.0 Volts (V) to 57.0 V, 350 milli Amps (mA) (max);

Each of PD2, PD4, and PD6 has the following requirements as a PD:

51 W (max) at 42.5V to 57.0V, 1200 mA (max) (600 mA per pair) (Type 3); and

PD3 has the following requirements as a PD:

12.95 W (max) at 37.0 V to 57.0 V, 350 mA (max) (Type 1).

Each of PSE1 and PSE2 may be a Type 3 or Type 4 PoE device, for example, delivering power to switch 106 over a category 5 (CAT5) or a CAT6 ethernet cable (examples of the types of ethernet cables 108, 110 in FIG. 1) with the following power source (or PSE) requirements:

60 W (max) at 50.0 V to 57.0 V (Type 3); and

100 W (max) at 52.0 V to 57.0 V (Type 4).

In accordance with the IEEE 802.3af standard, the amount of power delivered over a CAT 5 or a CAT 6 cable is 15.4 W and in accordance with the IEEE 802.3at standard, the amount of power delivered over a CAT 5 or a CAT 6 cable is 30 W with 25.5 W available to the downstream devices. The approximate power loss of 4.5 W in the latter case is attributable to the ethernet cable, which can extend up to 100 meters (m) pursuant to current IEEE 802.3 standards. In some embodiments, one or more of the ethernet cables 120-130 may be a twisted pair, CAT 5 or CAT 6, cable type. Ethernet cables 108, 110, and 120-130 need not be twisted pair or CAT 5, CAT 6 cable types and can be any ethernet cable type suitable for carrying power from an uplink to a downlink in conformance with the IEEE 802.3 standard and corresponding power budgets. For example, one or more of cables 108, 110, and 120-130 may be a fiber optics cable type or a coaxial cable type.

In some embodiments, switch 106 is a switch panel installed at a location of office building offices, such as shown in FIG. 1, for distributing power sourced by PSE1 and PSE2 to PD1-PD6. It is understood that in some embodiments, system 100 includes only one PSE device, for example, either PSE1 or PSE2, and switch 106 distributes power sourced from one of the PSEs to PD1-PD6. In some embodiments, switch 106 includes a load sharing circuit, as further discussed below. For example, two boost-converters, one for each uplink PSE1 and PSE2, work together to provide an equal output voltage to PD1-PD6. The dual boost converters can serve to isolate the uplinks. The load sharing feature makes more power available, and functions as a control loop to ensure both boost converters have substantially equal loads. In some embodiments, switch 106 may include an auxiliary supply for additional power, conditioning (discussed below), or even power redundancy.

In some embodiments, switch 106 may employ additional PSE devices to source a greater amount of power for use by downstream PDs. In some embodiments, switch 106 is a network switch facilitating the flow of packetized network traffic from power and data-carrying ethernet cables coupling switch 106 to PSE1 and PSE2 and from power and data-carrying ethernet cables coupling switch 106 to PD1-PD6. In some embodiments, switch 106 is a regenerative PoE mid-span injector device including active pass-through circuits for generating a voltage at the output of switch 106 that is greater than the voltage at the input of switch 106 providing sufficient input voltage to PD1-PD6 in conformance with the IEEE 802.3 standard. Switch 106 may be any ethernet device capable of facilitating the flow of power between one or more PSEs and one or more PDs and equipped with features as discussed relative to various embodiments herein.

In a large majority of circuit designs, power is typically constrained by load factor and load factor is typically proportional to load resistance, as well known by the mathematical relationship between power and resistance, i.e., power is equal to resistance times the square of current flowing through components with associated resistance. In the embodiment of FIG. 1, PD1-PD6 are effectively loads on system 100, each with an associated resistance or impedance causing the total voltage supplied by PSE1 and PSE2 to drop proportionally to the resistance. In this respect, the load factor associated with PD1-PD6 contribute to dictating the requisite power required from PSE1 and PSE2 to ensure proper operation of PD1-PD6 devices. The ethernet cable from PSE1 to switch 106 or from PSE2 to switch 106 and the ethernet cable from switch 106 to each of the PDs further contribute to power loss proportional to their associated voltage drop. Indeed, the greater the length of the cable, the greater the resistance of the cable, therefore, the greater the voltage drop across the cable leading to a greater power loss.

In the absence of switch 106, such as in a conventional PoE system, PSEs of certain specified power types with certain specified output voltage ranges are insufficient for adequately sourcing PDs of certain specified power types with certain specified input voltage ranges. Accordingly, the proper match between PSEs (uplinks) and PDs (downlinks) is vital to proper system operation. To take the case of PSE1 of Type 3, providing an output voltage specified in the range of 50.0 V to 57.0 V, to one of the PDs (e.g., PD1) of Type 2, with an input voltage specified in the range of 42.5 V to 57.0 V, assuming the voltage drop across one of the ethernet cables 108 and 120 is 10V drop, the PSE1 output voltage, at its minimum output voltage specification, 50.0V, fails to meet the required minimum input voltage, 42.5V, to power PD1 by 2.5V. Additionally, in some scenarios, PD1, serving as an upstream PoE device to a downstream PoE device may similarly fail to provide adequate power to the downstream PoE device. Moreover, in the embodiment of FIG. 1, the only source of uplink power to each of PD1-PD6 is from either PSE1 or PSE2 with no real power usage efficiency measures. A PD with a considerably lower power requirement than the power provided by a sourcing PSE1 or PSE2 is bound to leave excess power on the table. In some embodiments of the disclosure, as shown in FIG. 1, switch 106 shares the load from PD1-PD6 between PSE1 and PSE2 for maximum power utilization and to avoid power waste. In some embodiments, system 100 can tolerate greater power losses than conventional methods, for example, power loss attributable to cable length, by reproducing the uplink (PSE1 and PSE2) voltage at switch 106. The newly produced voltage at switch 106 ensures against failure to meet input voltage range standards requirements so long as the uplink power type is of a higher class than the downlink power type (e.g., Type 3 or Type 4 uplink power type and Type 1 or Type 2 downlink power type). In some cases, switch 106 achieves maximal ethernet cable length allowance for ethernet cables on both ends, the input ethernet cables coupling switch 106 to the PSEs and the output ethernet cables coupling switch 106 to the PDs. In some embodiments, the load sharing feature of switch 106 maximizes power consumption by the PDs. In some embodiments, switch 106 includes circuit isolation features, such as for isolating input ports and circuits coupled to PSE1 and PSE2, to avoid current backflow caused by electromagnetic interference (EMI)/electromagnetic compatibility (EMC) exposure to the switch circuits.

Switch 106 ensures further benefits to system 100. Let's assume PSE1 and PSE2, the main source of power for system 100, are located on a first floor equipment room of an office building and PD1-PD6 are located on a fifth floor office space of the same building, a location four floors higher than the location of the equipment room. In the absence of switch 106, at least 8 ethernet cables, namely, cables 108, 110, and 120-130, require wiring through four office building floors, from the first floor to the fifth floor. Further, each of the 8 cables 120-130 may be spread across a large area of the fifth-floor office spaces. In the presence of switch 106, only two cables, namely cables 108 and 110, require wiring between the first and fifth floors and all the cables 120-130 can be neatly centralized at a common destination location at switch 106.

FIG. 2A shows a conceptual diagram of a transmission parameter model of an illustrative power distribution system circuit, in accordance with some embodiments of the disclosure. FIG. 2A shows a conceptual diagram of a transmission parameter model of an illustrative power distribution system 200, in accordance with some embodiments of the disclosure. System 200 is shown to include a PSE 202, a PoE (power source) device, serving as power source to PD 206, a downstream device consuming power provided by PSE 202. System 200 further includes circuit 204 coupled between PSE 202 and PD 206. Specifically, circuit 204 is coupled to PSE 202 through an ethernet cable carrying current I1 and circuit 204 is further coupled to PD 206 through a different ethernet cable carrying the current I2. Circuit 204 is an intermediary device between PSE 202 and PD 206, serving as a PD to PSE 202 (PD') and a PSE to PD 206 (at PSE'). In some embodiments, circuit 204 receives the output voltage of PSE 202 but with a voltage drop (at PD') proportional to the voltage drop across the ethernet cable connecting PSE 202 to circuit 204 in addition to circuit-based voltage drops. In some cases, the voltage at PD' is less than the PSE 202 output voltage by more than an ethernet cable voltage drop due to component-based voltage drops. For example, circuit 204 may account for a further decrease in the voltage level at the output of PSE 202, in addition to the voltage drop in connection with the cable connecting circuit 204 and PSE 202. In the interest of simplicity, in the embodiments of FIGS. 1-9, circuit or component-related voltage drops are presumed to be nonexistent.

In some embodiments, circuit 204 boosts the output voltage at PSE 202 to account for cable and other power loss to a new voltage (of PSE') to meet IEEE power utilization standards at PD 206. Another example of PD' and PSE' is shown in FIG. 1. In FIG. 1, switch 106 includes input ports for receiving ethernet cable-connected PSEs and output ports for delivering power to PD1-PD6 through respective ethernet cables. The input port receiving ethernet cable 108 from PSE1 is labeled PD'1 and the input port receiving ethernet cable 110 from PSE2 is labeled PD'2. Further, the switch output ports coupling ethernet cables to PD1-PD6 are correspondingly labelled PSE' 1—

As earlier noted, FIG. 2A is a conceptual representation of the power distribution system 200, accordingly, circuit 204 is a conceptual representation of a circuit functioning as a switch of various embodiments disclosed herein, for example switch 106 of FIG. 1. Specifically, FIG. 2A shows an illustrative transmission parameter model of the various embodiments of the disclosure. Transmission defines a power input to power output problem. Taking the example of FIG. 1, the power available at switch 106 is the power at the switch's PD' input less losses. The problem pertains to efficiency. However, some linear solutions are efficient at light loads, whereas switching solutions are effective at heavy loads. Efficiency notwithstanding, a system of various embodiments of the disclosure, such as system 100 of FIG. 1, is more concerned with transmitting as much uplink power to the downlinks as possible.

The term "transmission", as referenced herein, refers to the amount of power that can be delivered to a downlink PD from an uplink PSE without the voltage at the input to the PD dropping below the PD's input voltage requirement. The term "transfer", as referenced herein, defines the length of an ethernet cable coupling the uplink PSE and the downlink PD. In the ideal but less than practical solution, all the power from the uplink PSE transfers to the downlink PD. The circuit configuration of FIG. 2A outlines the power flow from PSE 202 to a PoE active pass-through device, circuit 204, and from circuit 204 to PD 206. The active pass-through device is both a PD and a PSE, hence the notation "PD'" representing power for the device uplink side and the notation "PSE'" representing power for the device downlink side. Given the IEEE 802.3 specification, the following equality must hold:

(uplink side power) PD'>(downlink side power) PSE'; and VPD' (uplink side PD voltage) >VPSE' (downlink side PSE voltage.) Eq. (1)

Simply stated, the power available at the device downlink must exceed the power required and that the voltage input at the device downlink must be greater than the required (IEEE-specified) voltage output at the device uplink.

Following Kirchhoff's law (algebraic sum of all voltages in a closed loop network loop must be 0; Or in any closed loop network, the total voltage around the loop must be equal to the sum of all the voltage drops within the same loop), the voltage equality of Eq. (1) in the absence of circuit 204 is invalid. But in the presence of circuit 204, the equality need not be met and circuit 204 is configured as a voltage boost circuit, for example. Even with a typical 90% efficiency factor, which results in 7 W of power loss, the voltage can be boost at circuit 204 to effectively address the issue of voltage drop, thus removing the voltage equality requirement while maintaining power equality. In the face of power loss and as previously discussed, the downlink device must be at a lower power class than the uplink device (e.g., Type 4 to Type 3), but in exchange, a greater system power efficiency is achieved by maximizing power transmission and transfer. Further details of the model of FIG. 2A follow.

The transmission parameters "ABCD" of circuit 204 model a network's ability to transmit power from an input port ($V_1$ and $I_1$) to an output port ($V_2$ and $I_2$). In the simplest case, at the input port of circuit 204, the power available is shown at uplink PD' and at the output port of circuit 204, the power transmitted is shown at downlink PSE'. Eq. (2) below models the net $$\begin{bmatrix} V_1 \\ I_1 \end{bmatrix} = \begin{bmatrix} A & B \\ C & D \end{bmatrix} \begin{bmatrix} V_2 \\ -I_2 \end{bmatrix} \quad \text{Eq. (2)}$$

Since a power transmission problem is a question of maximizing the product of V2 and I2 for a given input power, the inverse transmission matrix compares the solution performance, as modeled by Eq. (3):

$$\begin{bmatrix} V_2 \\ -I_2 \end{bmatrix} = \begin{bmatrix} A' & B' \\ C' & D' \end{bmatrix} \begin{bmatrix} V_1 \\ I_1 \end{bmatrix} \quad \text{Eq. (3)}$$

In accordance with the IEEE 802.3 specification, V1 and I1 are VPD' (the uplink PD voltage) and IPSE (the downlink PSE current), respectively, while V2 and –I2 are VPSE' (the voltage of downlink PSE) and IPD (the current of uplink PD), respectively. Thus, a system of equations may be achieved that produces the equalities of Eqs. (4) and (5) below with the presumption that the input power must be greater than the output p Eq. (4) $V_{PSE}' \leq A'V'_{PD(min)} + B'$ Eq. (5) $I_{PD} \leq C'V'_{PD(min)} + D'I_{PSE(max)}$ The matrix of Eq. (3) may be extended for embodiments with an auxiliary supply or more ports. In this case, V4 and –I4 are added for representing the auxiliary supply and V3 and I3 represent an additional downlink, as used in Eq. (6) below. Although the transmission matrix is properly defined for balanced systems, solving is mathematically possible for unbalanced port configuration $$\begin{bmatrix} V_2 \\ -I_2 \\ V_4 \\ -I_4 \end{bmatrix} = \begin{bmatrix} A'_1 & B'_1 & A'_2 & B'_2 \\ C'_1 & D'_1 & C'_2 & D'_2 \\ A'_3 & B'_3 & A'_4 & B'_4 \\ C'_3 & D'_3 & C'_4 & D'_4 \end{bmatrix} \begin{bmatrix} V_1 \\ I_1 \\ V_3 \\ I_3 \end{bmatrix} \quad \text{Eq. (6)}$$

For measurement of voltages (e.g. V1, V2), the following two methods (standard and inverse) may be employed:
Standard—
   Apply constant voltage, fixed current loads at the downlink
   Apply a current source at the uplink
   Measure power at the uplink
Inverse—
   Apply fixed voltage source at uplink
   Apply resistive load at the downlinks
   Measure power at the downlinks
Since the system only supports unidirectional power flow (from uplink to downlink and not vice versa), the source is applied at the uplinks. As such, the inverse matrix (Eq. (3)) is easier to measure. Accordingly, the model of FIG. 2A addresses the transmission criteria. It removes cables from the equation and allows for a simplified but effective comparison between the solutions.

The best cable length solution is to send the maximum current from the lowest allowable PSE voltage across the longest cable to a downstream PD. As such, inverse hybrid (G) parameters model this criterion, as shown by Eq. (7) below:

$$\begin{bmatrix} I_1 \\ V_2 \end{bmatrix} = \begin{bmatrix} g_{11} & g_{12} \\ g_{21} & g_{22} \end{bmatrix} \begin{bmatrix} V_1 \\ I_2 \end{bmatrix} \quad \text{Eq. (7)}$$

The source voltage, V1, and the load current, I2, are the independent variables for the uplink's PSE, and the downlink's PD current. As such, the G-network's equivalent Thevenin circuit in FIG. 2C shows g22 to be the load, and g11 to be the source (i.e. cable resistance). As such, the best solution enables the highest network of g11 for a given load.

FIGS. 2B and 2C show conceptual diagrams of G-equivalent circuits of the system of FIG. 2A. The parameter $g_{21}$ allows the model to account for voltage conversion or voltage boost within an active pass-through switch device of various embodiments of the disclosure, for example, switch 106 and the ethernet switches of the embodiments of FIGS. 2-9. Since power transfer is unidirectional, $g_{12}$ is ideally 0, and this parameter value provides a unilateral figure of merit for the active pass-through network, as follows:

$$g_{11} \stackrel{def}{=} \frac{I_1}{V_1}, I_2 = 0 \quad \text{Eq. (8)}$$

$$g_{21} \stackrel{def}{=} \frac{V_2}{V_1}, I_2 = 0 \quad \text{Eq. (9)}$$

$$g_{12} \stackrel{def}{=} \frac{I_1}{I_2}, V_1 = 0 \quad \text{Eq. (10)}$$

$$g_{22} \stackrel{def}{=} \frac{V_2}{I_2}, V_1 = 0 \quad \text{Eq. (11)}$$

Measuring g11, g12, g21, and g22 requires a voltmeter, ammeter, and ohmmeter for measuring voltage, current, and resistance, respectively, as follows:
- g11, input resistance at uplink ports when the downlinks are open circuit
- g12, current output at the uplink ports when the uplink is shorted
- g21, voltage output at downlink ports when uplink is connected to voltage source
- g22, the load FIG. 2D shows a conceptual diagram of a circuit equivalent model of the system of FIG. 2A. The system of FIG. 2D is a circuit including a power supply, V1, representing a PSE, a switching element, Q1, and an inductor, L1. The circuit is shown to carry the load R1 (g22 above), representing the load from a PD. By the integral relationship at Eq. (12) below, alternating the input voltage, using the switch Q1, across the inductor, L1, produces a current. If done for all (PSE) sources, the current is shared.

$$I = \frac{1}{L} \int_0^t V(\tau) d\tau \quad \text{Eq. (12)}$$

In Eq. (12) above, "t" represents a changing time, "L" represents the inductance of the inductor L1, "V(τ)" represents voltage changing with time and "dτ" represents the change in time. This technique takes current balancing from multiphase voltage regulators and re-applies the balanced current for a high-efficiency load sharing circuit, example implementations of which are shown in subsequent figures.

One of the greatest impediments for power transfer is voltage drop. Load sharing cannot account for the voltage drop in the ethernet cable feeds or from the active pass-through circuit itself. Regenerating, or boosting the PD' voltage, enhances the ability of the active pass-through circuit to send maximum PoE power through the maximum IEEE-specified cable length.

Given the PoE IEEE 802.3 specification, for heavy load cases, Vpd' will be less than Vpse', and this overlap inhibits the transfer of the maximum load power through the maximum distance (cable length) to a downlink PD, as shown by the following IEEE-specified power classes:

IEEE 802.3af (Type 1): 37.0 $V \leq V_{pd} \leq 57.0$ V and 44.0 $V \leq V_{pse} \leq 57.0$ V IEEE 802.3at (Type 2): 42.5 $V \leq V_{pd} \leq 57.0$ V and 50.0 $V \leq V_{pse} \leq 57.0$ V IEEE 802.3bt (Type 3): 42.5 $V \leq V_{pd} \leq 57.0$ V and 50.0 $V \leq V_{pse} \leq 57.0$ V IEEE 802.3bt (Type 4): 41.1 $V \leq V_{pd} \leq 57.0$ V and 52.0 $V \leq V_{pse} \leq 57.0$ V In FIG. 2D, the output is regulated to provide a PSE' that meets the IEEE 802.3 specification. Moreover, in embodiments with two uplinks, both uplinks can be integrated into the same controller device for load sharing. In some embodiments with a boost converter, the boost converter can be cascaded after the load sharing circuit with proper constraints on the uplink voltage range.

Figure 3:
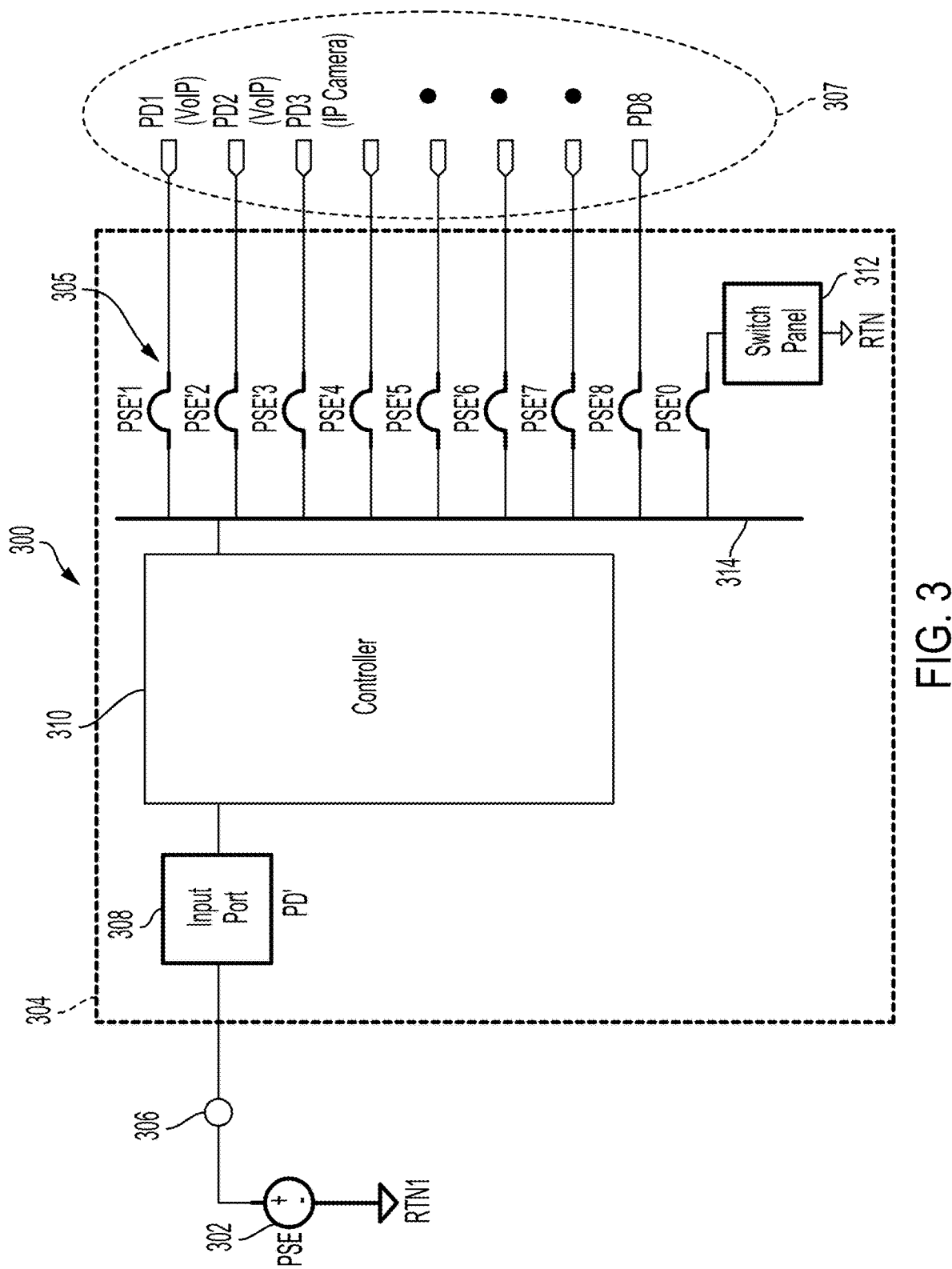
FIG. 3 shows an illustrative diagram of a power distribution system 300, in accordance with some embodiments of the disclosure.

FIG. 3 shows an illustrative diagram of a power distribution system 300, in accordance with some embodiments of the disclosure. System 300 is shown to include a PSE 302, an ethernet switch 304, and a set of PDs 307. PSE 302 and each of PDs 307 are example PoE devices operating in conformance with the IEEE 802.3 power specifications. PSE 302 is electrically coupled to switch 304 through an ethernet cable 306. PSE 302 is an uplink and PDs 307 serve as downlinks to uplink PSE 302. In the absence of switch 304, system 300 would resemble a conventional power distribution system with PSE 302 providing power through cable 306 to PDs 307 but with no assurances of meeting the power requirements of the IEEE standards nor with the expectation to do so while maximizing the length of ethernet cables connecting switch 304 to the PDs 307 or the length of cables possibly connecting the PDs 307 potentially serving as PSEs to additional downstream devices (not shown in FIG. 3), as discussed above. In the embodiments of FIG. 3, switch 304 is an intervening device to the coupling between PSE 302 and PDs 307. In some embodiments, switch 304 is configured as switch 106 of FIG. 1. Switch 304 may be configured as a switch different than switch 106. Switch 304 may be an ethernet device facilitating the flow of power between PSE 302 and PDs 307 in conformance with the IEEE 802.3 standard.

Switch 304 is shown to include an input port 308, a controller 310, a switch panel 312, a bus 314, and a set of output ports 305. In some embodiments, each of the output ports 305 includes a switch (at PSE'1-PSE'8) for selectively coupling bus 314 to a corresponding PD of the set of PDs 307. For example, the output port labeled PSE'1 of output ports 305 is shown coupled to PD1 of the set of PDs 307, the output port labeled PSE'2 of output ports 305 is shown coupled to PD2 of the set of PDs 307, and so on. The switch shown at PSE'0 is for selectively connecting and disconnecting switch panel 312 from bus 314 in the presence of a damage-causing event to the remaining components of switch 304.

The input port 308 of switch 304 serves as a downlink, PD', to PSE 302, and the switches (at PSE'1-PSE'8) at the output ports 305 located at the output ports of switch 304 serve as uplinks, PSE'1-PSE'8, to PD1-PD8 of PDs 307, respectively. In some embodiments, switches at output ports 305, PSE'1-PSE'8, may each be a circuit breaker implemented as a diode, a MOSFET transistor, or other switching mechanisms suitable for disconnecting bus 314 from PDs 307 in response to a detected current exceeding a current level tolerable by PDs 307 to prevent damage to the remaining components of switch 304. In some embodiments, each of the output ports 305 is coupled to a PD of PDs 307 through an ethernet cable. For example, switch 304 may be configured as switch 106 in FIG. 1 and output ports 305 may be coupled to the PDs in FIG. 1 through cables 120-130.

In some embodiments, input port 308 may be a node, a pulldown transistor, or one or more other types of devices for receiving ethernet cable 306. In a nonlimiting example, input port 308 may include one or more registered jack (RJ) type of connectors for connecting to a receiving end of cable 306. In some embodiments, switch panel 312 is a distribution panel, such as shown relative to switch 106 in FIG. 1, and bus 314 is a parallel or serial communication bus configured to support IEEE 802.3 ports. For example, bus 314 may be an I²C serial communications bus or a system management bus (SMbus). In some embodiments, controller 310 may include input port 308, switch panel 312, or both. In some embodiments, input port 308 and switch panel 312 may be housed as a single unit. In some embodiments, system 300, for example, switch 304 of system 300, may include an auxiliary circuit not shown in FIG. 3 but shown and discussed relative to subsequent figures herein.

In operation, switch 304 receives cable 306 at input port 308. Cable 306 carries power sourced from PSE 302 and intended for consumption by downlinks, PDs 307. In some embodiments, the classification of PSE 302 is higher than the classification of any of the PDs of PDs 307, therefore, the power provided by PSE 302 is of a higher type than the power consumed by PDs 307, which are of a lower type. The power and output voltage at PSE 302 may be at a specified power and output voltage range, for example, of a Type 3 or Type 4 classification in conformance with the IEEE 802.3 standard. Analogously, the power and input voltage at the PDs 307 may be at a specified power and input voltage range, respectively, for example of a Type 1 or Type 2 classification in conformance with the IEEE 802.3 standard. In some embodiments, the output voltage at PSE 302 is typically at a level higher than the voltage at the input of switch 304, for example, at input port 308, at least in part due to the voltage drop across cable 306. The voltage drops across cable 306 may be a function of the length and type of ethernet cable employed. Other factors may further contribute to the difference in voltage from the output of PSE 302 to the input port 308 or the output of input port 308 and the input of controller 310. For example, input port 308 may be an added (in addition to the cable voltage drop) source of voltage drop relative to the output voltage at PSE 302. In some cases, the voltage drops (due to ethernet cable 306) from PSE 302 to controller 310 may be approximately 7V-10V. It is at least for this reason that the minimum required input voltage for at least some power classifications of PDs 307 cannot be guaranteed but for intervention, such as boost voltage intervention by controller 310.

In some embodiments, controller 310 includes a voltage booster circuit for raising the voltage at input port 308 to regenerate a new voltage at the output of controller 310 for the benefit of PDs 307. In some embodiments, the voltage increase may be a voltage amount at least equal to the minimum voltage of the lowest specified input voltage range for PDs 307. With continued reference to the above example, PSE 302 may be of a Type 3 device, providing an output voltage specified in the range of 50.0 V to 57.0 V to PD1 (of PDs 307), a Type 2 device and the remaining PDs of PDs 307 are Type 2 devices, for example, a VoIP device, with an input voltage specified in the range of 42.5 V to 57.0 V. Assuming the voltage drop across cable 306 and the ethernet cable connecting bus 314 to PD1 is 14V, a 6.5V minimum input voltage deficit at the input of PD1, controller 310 boosts the voltage at input port 308 by at least 6.5V. In some embodiments, controller 310 is equipped with a voltage regulator feature to maintain a particular voltage level within a negligible tolerance at bus 314 for ensuring proper operation of all Type 1 and Type 2 PDs 307. For example, controller 310 may boost the voltage at input port 308 to 54V with a voltage booster and maintain the voltage at 54V within a design tolerance with use of a voltage regulator. In some embodiments, the voltage booster and voltage regulator features of controller 310 are facilitated by a single circuit and in some embodiments, the voltage booster and voltage regulator features of controller 310 are facilitated by more than one and distinct circuits. The voltage booster and voltage regulator may be any voltage boost part and/or voltage regulator circuit operational at mid-level voltage ranges at least covering the voltage range specifications for all IEEE 802.3 classifications (e.g., 2V-100V), with features described herein, such as without limitation, accepting of a wide voltage input range and a broad range of duty cycles, as further discussed below, for example, relative to the embodiment of FIG. 7. In embodiments with controller 310 including a voltage regulator feature, the power loss experienced by system 300, for example, caused by ethernet cable 306, is factored into the efficiency of the voltage regulator of controller 310.

Figure 4:
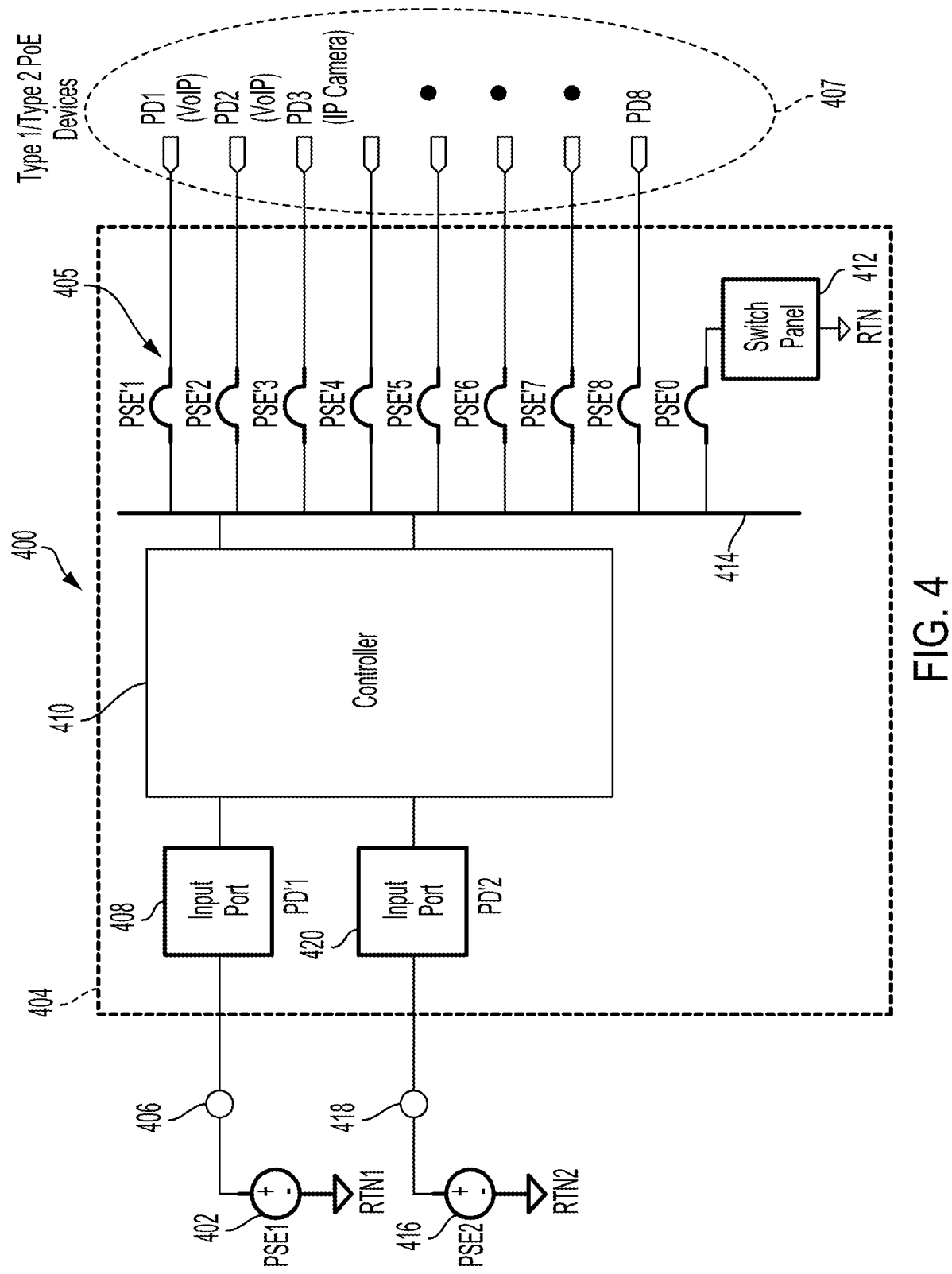
FIG. 4 shows an illustrative diagram of a power distribution system 400, in accordance with some embodiments of the disclosure.

FIG. 4 shows an illustrative diagram of a power distribution system 400, in accordance with some embodiments of the disclosure. In some embodiments, system 400 is configured analogously to system 300 of FIG. 3 with noted exceptions as provided below and illustrated in FIG. 4. System 400 is shown to include two PSEs, PSE1 402 and PSE2 416, an ethernet switch 404, and a set of PDs 407. In some embodiments, PSE1 402, PSE2 416 and each of PDs 407 are PoE devices operating in conformance with the IEEE 802.3 power specifications. It is understood that while system 400 is shown to include two PSEs in FIG. 4, system 400 is not limited to two PSEs and may include more than 2 PSEs.

Switch 404 is shown to include two input ports, input port 408 and input port 420, a controller 410, a switch panel 412, a bus 414, and a set of output ports 405. As in the case of output ports 305 of system 300, in some embodiments, each of the output ports 405 includes a switch for selectively coupling bus 414 to a corresponding PD of the set of PDs 407. The components of system 400 may be coupled and may operate analogously to the components of system 300 of FIG. 3, as described above, except that system 400 includes an additional coupling from PSE2 416 to input port 420 of switch 404 through an ethernet cable 418. PSE1 402 is electrically and mechanically coupled to input port 408 of switch 404 through ethernet cable 406 and PSE2 416 is electrically and mechanically coupled to input port 420 through ethernet cable 418.

In the embodiment of FIG. 4, each of PSE1 402 and PSE2 416 is a separate and distinct uplink to the downlinks PDs 407. As such, without the benefit of controller 410, the power provided by each PSE is separately expended by PDs 307 and any excess power or power deficiency, for example, based on the PDs' power classifications, is not aided to conform to IEEE 802.3 power standards nor to maximize power distribution usage. Furthermore, without the benefit of controller 410, combining PSE1 402 and PSE2 416 outputs at switch 404, without proper isolation mechanisms in place, could cause current backflow, for example, caused by EMI/EMC from ethernet cables 406 and 418, respectively.

In some embodiments, controller 410 includes an isolation circuit for isolating PSE1 402 and PSE2 416, at the outputs of input ports 408 and 420, respectively. For example, in the example of FIG. 1, where each PSE is positioned at a different location and provides a distinct output voltage relative to the other (i.e., common mode differences between the two PSEs), yet at controller 410, the two inputs are combined at a common node (e.g., bus 414), the current from the PSE1 406 return path ("RTN1") and the PSE2 416 return path ("RTN2") may flow between the two return paths. This situation can occur, for example, when the voltage at controller 410 exceeds the voltage at the input of controller 410. A suitable isolation circuit in controller 410 isolates the two PSE outputs at controller 410 to guard against possible current backflow effects. In some embodiments, controller 410 may implement a voltage booster feature to raise the voltage at a node within controller 410 that combines the signals at input ports 408, 420. Controller 410 may further include a voltage regulator feature regulating the raised (or new, regenerated) voltage, or both, as discussed relative to FIG. 3 above. Examples of a voltage booster, without limitation, are a flyback transformer converter, and/or a voltage boost, buck, and buck-boost circuits. In the case of a voltage boost or buck circuit, circuit isolation may require adding further components, whereas, in the case of a buck-boost circuit design, isolation may be an integrated feature. In some embodiments, the voltage booster of controller 410 may comprise N-turn coils, for example, one coil at each input port 406 and 418 and a third coil at a node combining the outputs of the two input port coils. The number of coils, represented by "N", may be based on the voltage boost amount. Such a coil-based design, while raising the combined input port voltages to a new voltage level, may not offer an isolation feature in the absence of further designed circuitry.

Figure 5:
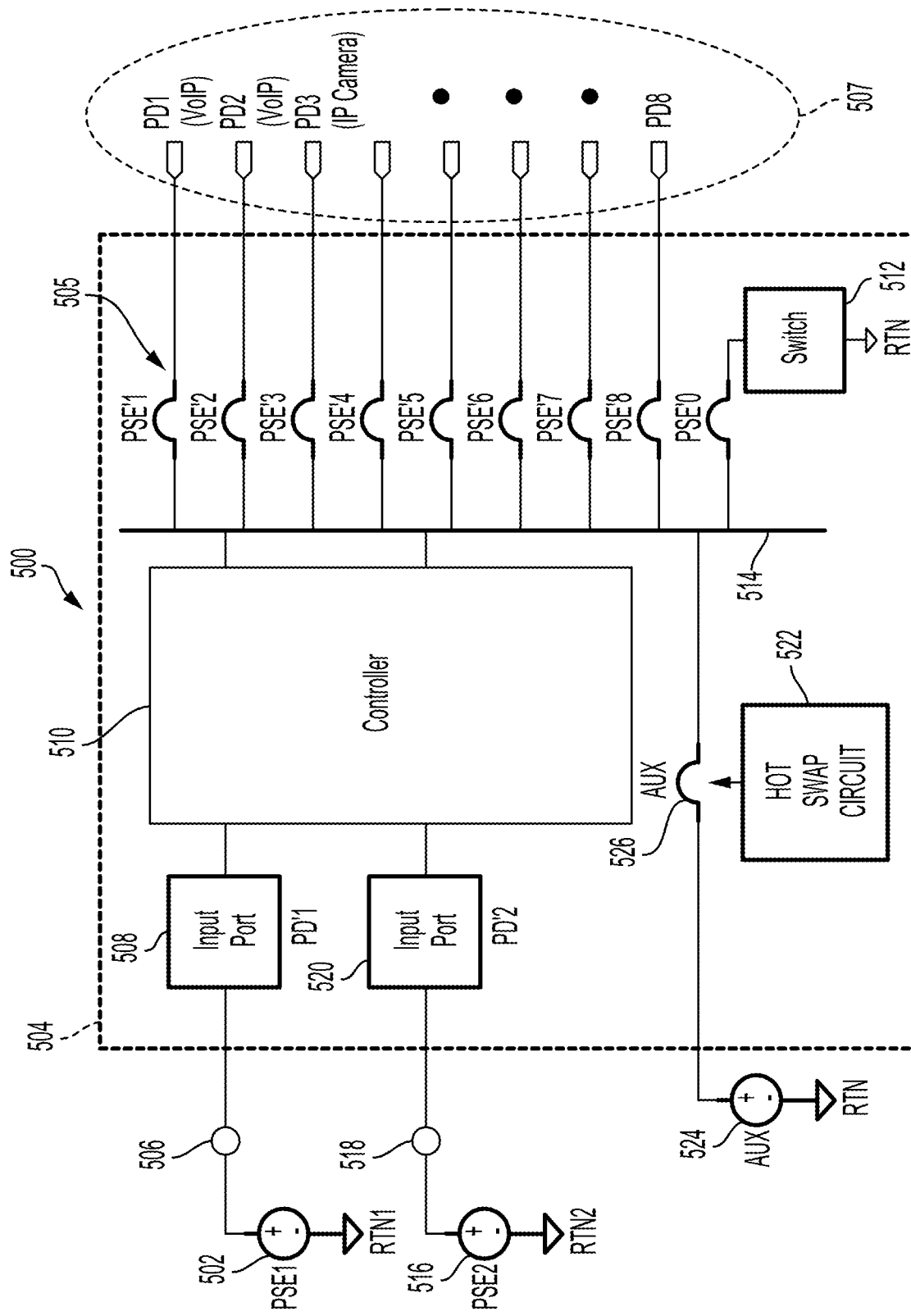
FIG. 5 shows an illustrative diagram of a power distribution system 500, in accordance with some embodiments of the disclosure.

As previously discussed, a controller of power distribution circuits of various embodiments of the disclosure, may include an auxiliary circuit for alternative or additional power or for charge conditioning. The auxiliary circuit may serve as a conditioning supply as further discussed below. FIG. 5 shows an illustrative diagram of a power distribution system 500, in accordance with some embodiments of the disclosure. In some embodiments, system 500 is configured analogously to system 400 of FIG. 4, respectively, with noted exceptions as provided below and shown in FIG. 5. System 500 is shown to include two PSEs, PSE1 502 and PSE2 516, an ethernet switch 504, and a set of PDs 507. In some embodiments, PSE1 502, PSE2 516 and each of PDs 507 are PoE devices operating in conformance with the IEEE 802.3 power specifications.

Switch 504 is shown to include two input ports, namely, input port 508 and input port 520, a controller 510, a switch panel 512, a bus 514, a set of output ports 505, an auxiliary power source 524, hot swap circuit 522, and an auxiliary switch 526. As in the case of the output ports 405 of system 400, in some embodiments, each of the output ports 505 includes a switch (shown at each PSE'1-PSE'8 in FIG. 5) for selectively coupling bus 514 to a corresponding PD of the set of PDs 507. The components of system 500 may be coupled and may operate analogously to the components of system 400 of FIG. 4, as described above. For example, analogously to system 500, system 400 may include an additional auxiliary circuit, such as the auxiliary circuit of FIG. 5. In some embodiments, the power distribution systems, such as without limitation, systems 100 (FIG. 1), 200 (FIG. 2) may each include an auxiliary circuit such as the auxiliary circuit of FIG. 500.

With continued reference to system 500, the auxiliary circuit may comprise auxiliary power source 524, hot swap circuit 522, and auxiliary switch 526. In some embodiments, the auxiliary circuit of FIG. 5 may be incorporated, in part or in whole, into controller 510. In some embodiments, the auxiliary circuit of FIG. 5 may be incorporated, in part or in whole, into switch 512. While may not be shown in all subsequent figures, it is understood that an auxiliary circuit analogous to the auxiliary circuit of FIG. 5 may be incorporated into the systems of FIGS. 6-9.

In some embodiments, auxiliary switch 526 is a circuit breaker, a transistor switch, or a diode. Auxiliary switch 526 is not limited to the foregoing circuits and may be any switching mechanism suitable to connect and disconnect auxiliary power source 524 from bus 514 under the control of circuit 522. Circuit 522 may comprise a control signal for controlling the connection and disconnection feature of auxiliary switch 526 for coupling or decoupling auxiliary power source 524 from bus 514 based on a detected new PSE (not shown) connection to controller 510 and therefore to bus 514. In some embodiments, a new PSE connection may be detected by a commercially available automatic PoE detection device or a valid PoE signature from the new PSE device.

Auxiliary power source 524 is a power source providing an alternate source of power equivalent to an uplink-provided power to PDs 507 through bus 514. The auxiliary circuit of FIG. 5, including auxiliary power source 524, may serve as a conditioning circuit. When either of PSE 502 and PSE2 516 are initially coupled to controller 510, they may disruptively generate a charge injection or reduce the charge at the respective input of controller 510. For example, system 500 may be energized prior to coupling a new uplink and the newly coupled uplink may have a deenergizing effect, introducing a surge of an unknown amount of energy or causing an undesirable type of energy or charge displacement potentially damaging to the remaining components of switch 504. When auxiliary source 524 is coupled to bus 512 through switch 526, hot swap circuit 522 conditions the new uplink connection. In an embodiment with the combination of switch 526 and circuit 522 including a diode, for example, the diode may prevent current backflow. The diode provides current control, i.e., current can only flow in one direction therefore preventing undesirable displacement of charge in an opposite direction. In the embodiment with the combination of switch 526 and circuit 522 including a MOSFET circuit with a ramp-up feature, the saturation region of the MOSFET may be used to charge up the system 500 as the new uplink is powered on to prevent switch 504 from experiencing unexpected surge events.

Figure 6:
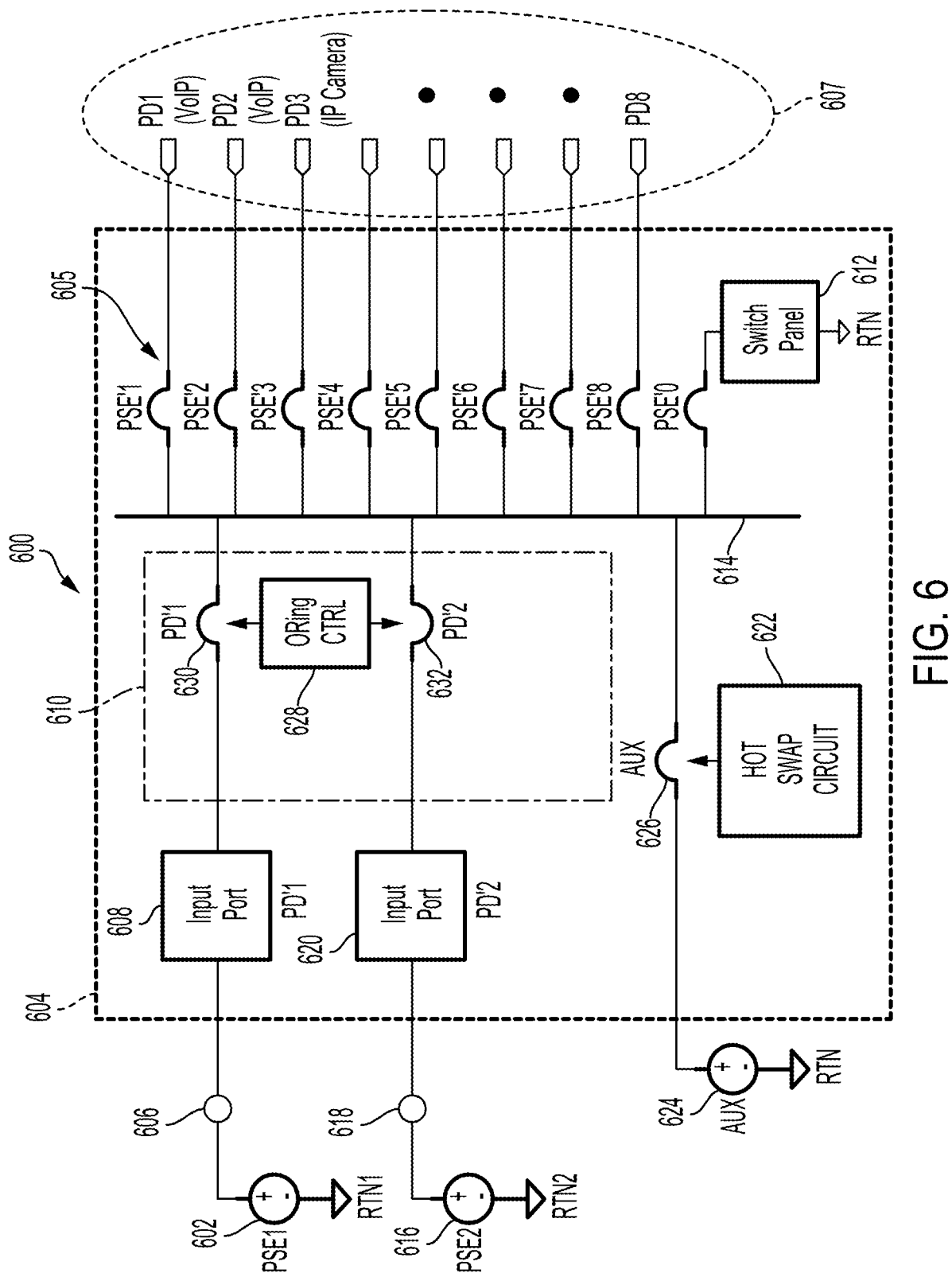
FIG. 6 shows an illustrative diagram of a power distribution system 600, in accordance with some embodiments of the disclosure.

FIG. 6 shows an illustrative diagram of a power distribution system 600, in accordance with some embodiments of the disclosure. In some embodiments, system 600 is configured analogously to system 400, 500 of FIGS. 4, 5, respectively, with noted exceptions as provided below. System 600 is shown to include two PSEs, PSE1 602 and PSE2 616, an ethernet switch 604, and a set of PDs 607. PSE1 602, PSE2 616 and each of PDs 607 are PoE devices operating in conformance with the IEEE 802.3 power specifications. System 600 is further shown to include an auxiliary circuit including an auxiliary power source 624, a hot swap circuit 622, and an auxiliary switch 626, as described relative to the auxiliary circuit of FIG. 5. In some embodiments, the auxiliary circuit of FIG. 6 functions analogously as the auxiliary circuit of FIG. 5. It is understood that while system 600 is shown to include two PSEs in FIG. 6, system 600 is not limited to two PSEs and may include more than 2 PSEs.

Switch 604 is shown to include two input ports, input port 608 and input port 620, a controller 610, a switch panel 612, a bus 614, and a set of output ports 605. As in the case of output ports 405, 505 of systems 400, 500, respectively, in some embodiments, each of the output ports 605 includes a switch for selectively coupling bus 614 to a corresponding PD of the set of PDs 607. The components of system 600 may be coupled and may operate analogously to the components of systems 400, 500 of FIGS. 4, 5, respectively as described above, except as discussed below and shown in FIG. 6.

Controller 610 of system 600 includes an ORing circuit comprising an ORing controller 628 coupled to two ORing switches 630 and 632. Switch 630 is effectively PD'1 and switch 632 is effectively PD'2 relative to PSE1 602 and PSE2 616, respectively. Switches 630 and 632 are shown coupled to bus 614 and operated under the control of controller 628. Switch 630 is shown coupled to input port 608 and switch 632 is shown coupled to input port 620. In an example embodiment, the ORing circuit of FIG. 6 may the LTC4370 Two-Supply Diode-OR Current Balancing Controller product, made by Analog Devices, Inc., of Norwood, Mass. The circuit of FIG. 6 is not limited to the foregoing ORing circuits and may not even be an ORing circuit, rather, it may be any suitable circuit with a load balancing feature that is operational at mid-level voltages, or at least the voltages covered by the IEEE 802.3 standard, as further discussed below.

Controller 610 of system 600 is effectively a load sharing control loop. The ORing circuit of controller 610 equalizes the voltages at the outputs of input port 608 and 620 by combining the powers provided by the two uplinks (PSE1 602 and PSE2 616) at the output of input port 608 and input port 620 and balancing the load from PDs 607 between PSE1 602 and PSE2 6. In some embodiments, the ORing circuit of FIG. 6 is an attenuator that dissipates voltage at switch 630 or switch 632, equalizing the voltages at the outputs of input port 608 and input port 620 therefore balancing the total load from the set of PDs 607 on PSE1 602 and PSE2 616 nearly equally between PSE1 602 and PSE2 616. The controller design of the embodiment of FIG. 6 is typically only properly operational at a limited input voltage range that may not adequately cover the wider voltage ranges specified by the IEEE standard, at the outputs of PSE1 602 and PSE2 616. For example, in a scenario where PSE 1 602 is a Type 3 or a Type 4 PoE device, the voltage difference between PSE1 602 and PSE2 616 is 7V (50V-57V), a range that may not be readily supported by commercially available ORing products manufactured for mid-voltage levels. For example, typical ORing products may regulate voltages within less than a voltage, and more commonly 200 millivolts.

The ORing circuit of FIG. 6 can be considered to function as a variable resistor controller that dissipates excess voltage between the voltages at the output of switches 630 and 632. Such excess power dissipation can prevent the system from the benefit of a full power availability spectrum, as power is lost at switches 630 and 632. Additionally, the voltages at input ports 608 and 620 remain unregulated. In the absence of regulation, power dissipation can only work for a certain voltage range because the components eventually overheat, possibly causing inoperability of switch 604. Additionally, the power proportionality to the square of current times resistance causes even the smallest of resistances attributable to the ORing circuit to dissipate a large amount of power. Accordingly, power dissipation may be another drawback of the embodiment of FIG. 6.

Figure 7:
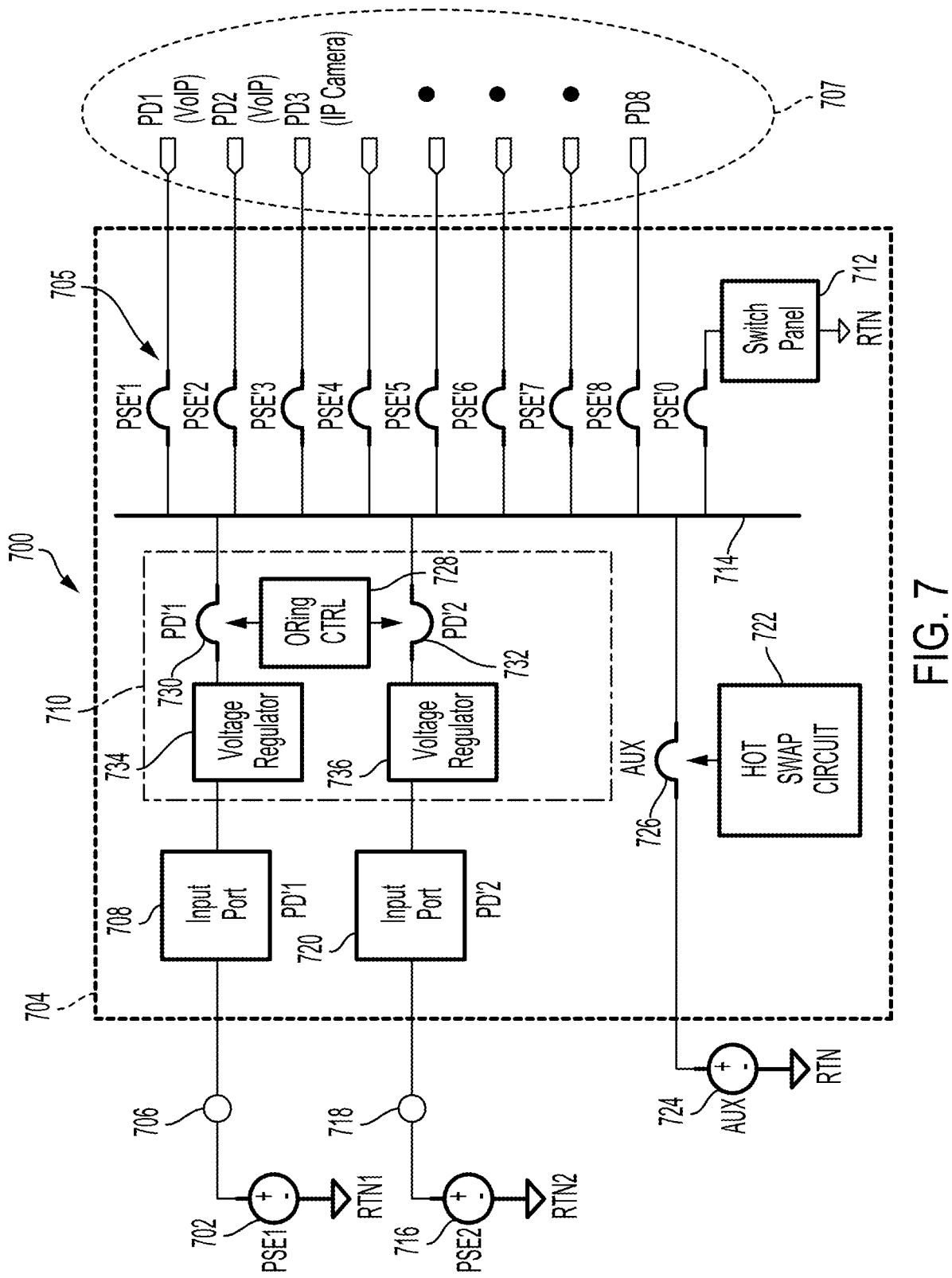
FIG. 7 shows an illustrative diagram of a power distribution system 700, in accordance with some embodiments of the disclosure.

FIG. 7 shows an illustrative diagram of a power distribution system 700, in accordance with some embodiments of the disclosure. In some embodiments, system 700 is configured analogously to system 400, 500, 600 of FIGS. 4, 5, 6, respectively, with noted exceptions as provided below and illustrated in FIG. 7. System 700 is shown to include two PSEs, PSE1 702 and PSE2 716, an ethernet switch 704, and a set of PDs 707. PSE1 702, PSE2 716 and each of PDs 707 are PoE devices operating in conformance with the IEEE 802.3 power specifications. System 700 is further shown to include an auxiliary circuit including an auxiliary power source 724, a hot swap circuit 722, and an auxiliary switch 726, as described relative to the auxiliary circuits of FIGS. 5, 6, respectively. In some embodiments, the auxiliary circuit of FIG. 7 functions analogously as each of the auxiliary circuits of FIGS. 5, 6. It is understood that while system 700 is shown to include two PSEs in FIG. 7, system 700 is not limited to two PSEs and may include more than 2 PSEs.

Switch 704 is shown to include two input ports, input port 708 and input port 720, a controller 710, a switch panel 712, a bus 714, and a set of output ports 705. As in the case of output ports 405, 505, 605 of systems 400, 500, 600, respectively, in some embodiments, each of the output ports 705 includes a switch (at PSE') for selectively coupling bus 714 to a corresponding PD of the set of PDs 707. The components of system 700 may be coupled and may operate analogously to the components of systems 400, 500, 600 of FIGS. 4, 5, 6, respectively, as described above, except as discussed below and illustrated in FIG. 7.

Controller 710 of system 700 includes two voltage regulators, a voltage regulator 734, a voltage regulator 736, an ORing circuit comprising an ORing controller 728 coupled to two ORing switches 730 and 732. Switch 730 effectively serves as PD'1 to PSE1 702 and switch 732 effectively serves as PD'2 to PSE2 716. Switches 730 and 732 are each shown coupled to bus 714 at one end and to voltage regulator 734 and voltage regulator 736, respectively, at an opposite end. Switches 730 and 732 are controlled by controller 728. Voltage regulator 734 is shown coupled to receive input from the output of input port 708 and to generate a voltage regulator output to switch 730 of the ORing circuit. Analogously, voltage regulator 736 is shown coupled to receive input from the output of input port 720 and to generate a voltage regulator output to switch 732 of the ORing circuit. In an example embodiment, the ORing circuit of FIG. 7 is analogous to the ORing circuit of FIG. 6, as previously described.

In some embodiments, each of the voltage regulators 734 and 736 may comprise a combination of a transformer circuit (e.g., flyback transformer or forward conversion) to raise the input voltage to a design-selected voltage level and a voltage regulator circuit (e.g., buck-boost converter) for maintaining the voltage at the raised voltage level. ORing controller 728 fine tunes the voltages at the output of the regulators (or the input of respective switches 730 and 732) to remove the voltage differences at the output of regulators 734 and 736 within an acceptable tolerance. For example, the ORing circuit of FIG. 7 may regulate the voltage level within a volt to account for component mismatches due to manufacturing tolerances to further equalize the voltages at the outputs of the regulators to a common desired voltage. The ORing circuit of FIG. 7 helps maintain the voltages at the output of regulators 734 and 736 at the desired equalized (raised) voltage. Accordingly, the voltage at the output of switches 730 and 732 is substantially equal and the load from the PDs 707 is equally shared by the combined power from PSE1 702 and PSE2 716.

More specifically, during operation, each of voltage regulators 734 and 736 regulates a respective input voltage on a respective input port to a voltage set point, one that is substantially common at the outputs of each voltage regulator. Nevertheless, regulator component manufacturing tolerances may result in inaccuracies that prevent the two regulator output voltages to match as closely as desirable to ensure meeting the IEEE 802.3 standards. The voltage difference between the two regulators, which may be, for example, within a percentage, is adjusted by the ORing circuit of FIG. 7 such that the voltage at the output of each of the switches 730 and 732 (input to bus 714) is made common or equalized, as discussed relative to the embodiment of FIG. 6 (i.e., the ORing circuit may function as a controlled variable resistor that dissipates power to balance the currents through respective ORing circuit switches 730 and 732). That is, the ORing circuit will adjust for a percentage of voltage differential between the two voltage regulator outputs such that substantially equal current flows through the output of each of switches 730 and 732. In this respect, voltage regulators 734 and 736 achieve a common voltage and the ORing circuit achieves an equal current at the output of switches 730 and 732 and the input of bus 714.

In some embodiments, the voltage at the output of each of the voltage regulators 734 and 736 is a new or regenerated voltage. For example, assuming PSE1 702 is a Type 3 device and PSE2 716 is a Type 4 device, one device may provide a 50V-output and the other device may be provide a 57V-output, both in conformance with the IEEE 802.3 PSE voltage-specified ranges. Without the benefit of controller 710, the 7V differential between the two regulators may contribute to a lower input voltage for a Type 1 or a Type 2 PoE device, such as PD1, PD2, or PD3 of PDs 707. With the benefit of controller 710, assuming a voltage set point of 54V, voltage regulator 734 may adjust the voltage at input port 708 to 54V within a manufacturing tolerance, and voltage regulator 736 may also adjust the voltage at input port 720 to 54V within a manufacturing tolerance. The two tolerances may result in a voltage differential of no more than 1% that nevertheless places at risk meeting a specified IEEE PD classification input voltage range. The ORing circuit of FIG. 7 serves to more precisely adjust for the voltage differential between the two voltages to the desired voltage set point (e.g., 54V) to ensure IEEE standards compliance.

Because each voltage regulator boosts the voltage at a respective input port, the voltage from the input port can fluctuate widely. The boost converter of each voltage regulator adjusts for the wide input voltage difference guaranteeing a respective output substantially at a desired voltage setpoint, a voltage that is substantially the same at the outputs of voltage regulators 734 and 736.

In some embodiments, each of the voltage regulators 734 and 736 is a switching regulator and therefore relatively efficient. Voltage regulators 734 and 736 are not limited to switching regulators and may be any type of voltage regulator with voltage boost and voltage regulation features with the capability of operating in mid-level voltage ranges within the IEEE 802.3 standard voltage range specifications for all power classification types.

In some embodiments, the components of controller 710 may be integrated into a single component, such as a single semiconductor product. In this approach, the controller 710 component controls are integrated together and in this respect experience substantially the same voltage and current, i.e. power, and are in a position to more effectively perform load balancing. In some embodiments, more than one semiconductor may house the components of controller 710.

In some embodiments, controller 710 may further function to isolate the output of voltage regulators 734 and 736 to prevent current backflow by use of circuit isolation. For example, a flyback transformer or forward topologies with circuit isolation features may be employed to isolate the two input paths at input ports 708 and 720. In embodiments with a separate semiconductor device for each voltage regulators 734 and 736, examples of commercially available voltage regulator semiconductor devices that may be employed in system 700 to isolate the input ports are the MAX5996 product, manufactured by Maxim Integrated of Santa Clara, Calif., and the TPS2373 product, manufactured by Texas Instruments of Dallas, Tex.

In some embodiments, the ORing circuit of FIG. 7 may be eliminated with the outputs of voltage regulators 734, 736 directly coupled to bus 714. Regulators 734, 736 may regulate the voltage at a desired set point by controlling the duty cycle of the input of voltage regulators 734, 736. Stated differently, the output voltage of one of the voltage regulators (e.g., regulator 734) may be changed to match the output voltage of the remaining voltage regulators (e.g., regulator 736) by changing the voltage regulators' respective duty cycles. For example, assuming the output at each of the voltage regulators 734, 736 is to equalize at a desired voltage represented by "V", the input to voltage regulator 734 may be half of V, the input to voltage regulator 736 may be three-quarters of V, and the duty cycles of voltage regulators 734, 736 may be adjusted such that the duty cycle of voltage regulator 734 is 25% greater than the duty cycle of voltage regulator 736. Contrarily, the duty cycle of voltage regulator 736 may be adjusted to be 25% less than the duty cycle of voltage regulator 734. In a nonlimiting example, a pulse width module (PWM) may be incorporated, in part or in whole, into or coupled to one or both of voltage regulators 734, 736 for implementing requisite duty cycle adjustments. In some embodiments, a PWM, operational at the IEEE 802.3 specified voltage levels, may be coupled to or incorporated, in part or in whole, into one or both of the voltage regulators 734, 736 for adjusting the pulse of each respective voltage regulator input to achieve the requisite duty cycle for equalizing the voltage at bus 714.

In some embodiment, the voltage regulators of controller 710 may be replaced with a single voltage regulator. That is, the output of the ORing circuit of FIG. 7 may be input to a single voltage regulator. In this approach, the input voltages at ports 708 and 720 are combined and regulated by the ORing circuit and the voltage at the output of the ORing circuit is raised to the desired voltage level. But with this approach, the ORing circuit serves as a gating item to proper operation of controller 710 while receiving a wide input voltage range because the operation of the ORing circuit is limited to a narrow voltage range as previously discussed. Accordingly, while the foregoing approach is less costly than the embodiment shown in FIG. 7 based on the use of one instead of two voltage regulators, the IEEE voltage range specifications may not be readily accommodated for all classification types. Additionally, no circuit isolation is effectuated. In some embodiments, more than two PSEs may be input to switch 704 in which case additional respective input ports and voltage regulators may be employed for each PSE to boost the PD' voltage and more than one ORing circuit may be employed for voltage regulation.

Figure 8:
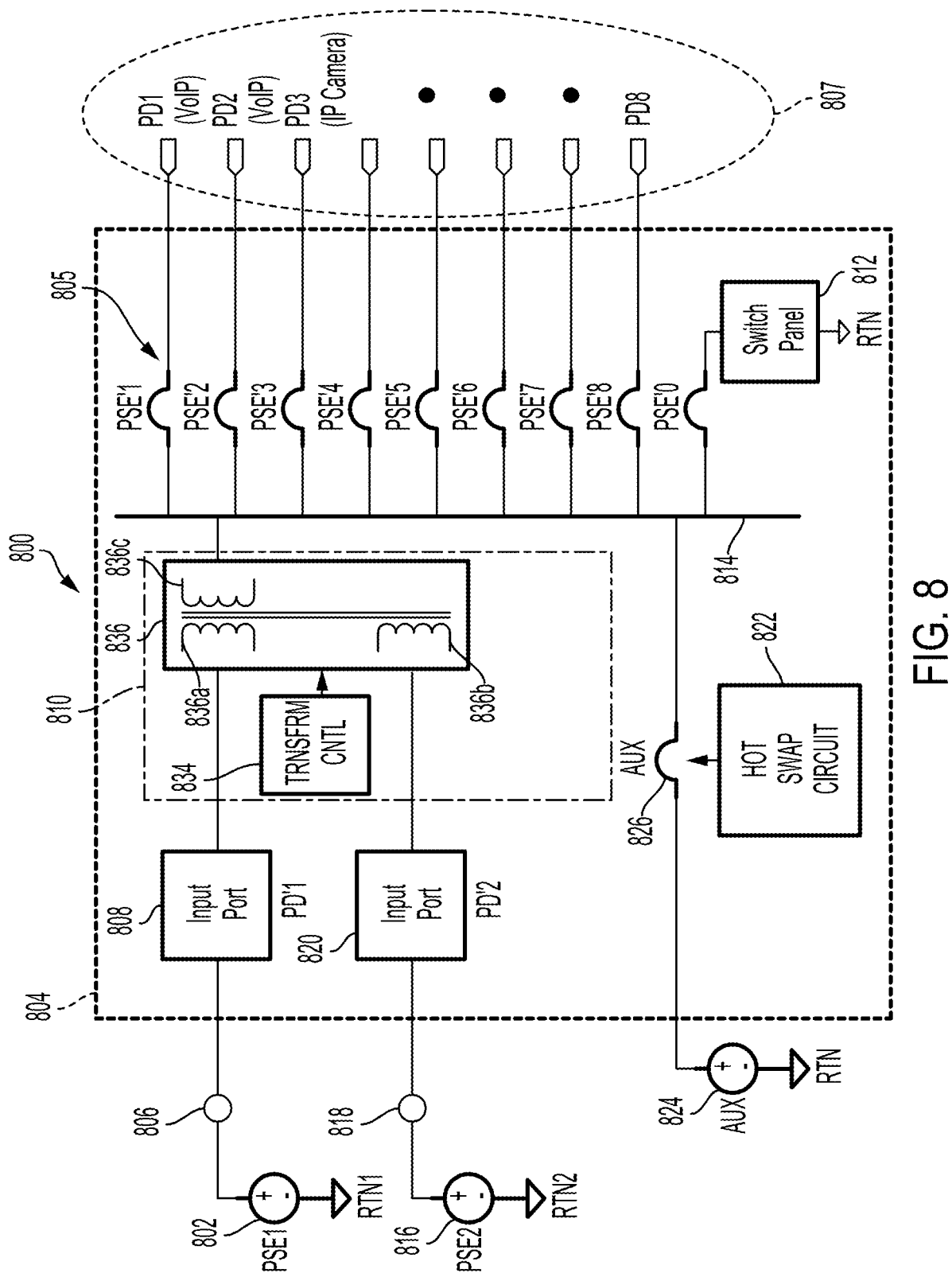
FIG. 8 shows an illustrative diagram of a power distribution system 800, in accordance with some embodiments of the disclosure.

FIG. 8 shows an illustrative diagram of a power distribution system 800, in accordance with some embodiments of the disclosure. In some embodiments, system 800 is configured analogously to system 400, 500, 600, 700, of FIGS. 4, 5, 6, 7, respectively, with noted exceptions as provided below and illustrated in FIG. 8. System 800 is shown to include two PSEs, PSE1 802 and PSE2 816, an ethernet switch 804, and a set of PDs 807. PSE1 802, PSE2 816 and each of PDs 807 are PoE devices operating in conformance with the IEEE 802.3 power specifications. System 800 is further shown to include an auxiliary circuit including an auxiliary power source 824, a hot swap circuit 822, and an auxiliary switch 826, as described relative to the auxiliary circuits of FIGS. 5, 6, respectively. In some embodiments, auxiliary circuit of FIG. 8 functions analogously as the auxiliary circuits of FIGS. 5, 6, respectively. It is understood that while system 800 is shown to include two PSEs in FIG. 8, system 800 is not limited to two PSEs and may include more than 2 PSEs.

Controller 810 of system 800 is shown to include a transformer controller 834 coupled to transformer 836. In some embodiments, transformer 836 may be a transformer operational at mid-level voltage ranges for magnetically coupled isolated boosts with a high level of power efficiency due to the transformer nearly perfect isolation feature. Under the control of controller 834, power is controlled from two coils (e.g., coils 836a and 836b of transformer 836) magnetically coupled onto one coil (e.g., coil 836c of transformer 836) to provide isolation and power balancing between PSE1 and PSE2 in one kind of control power device.

Figure 9:
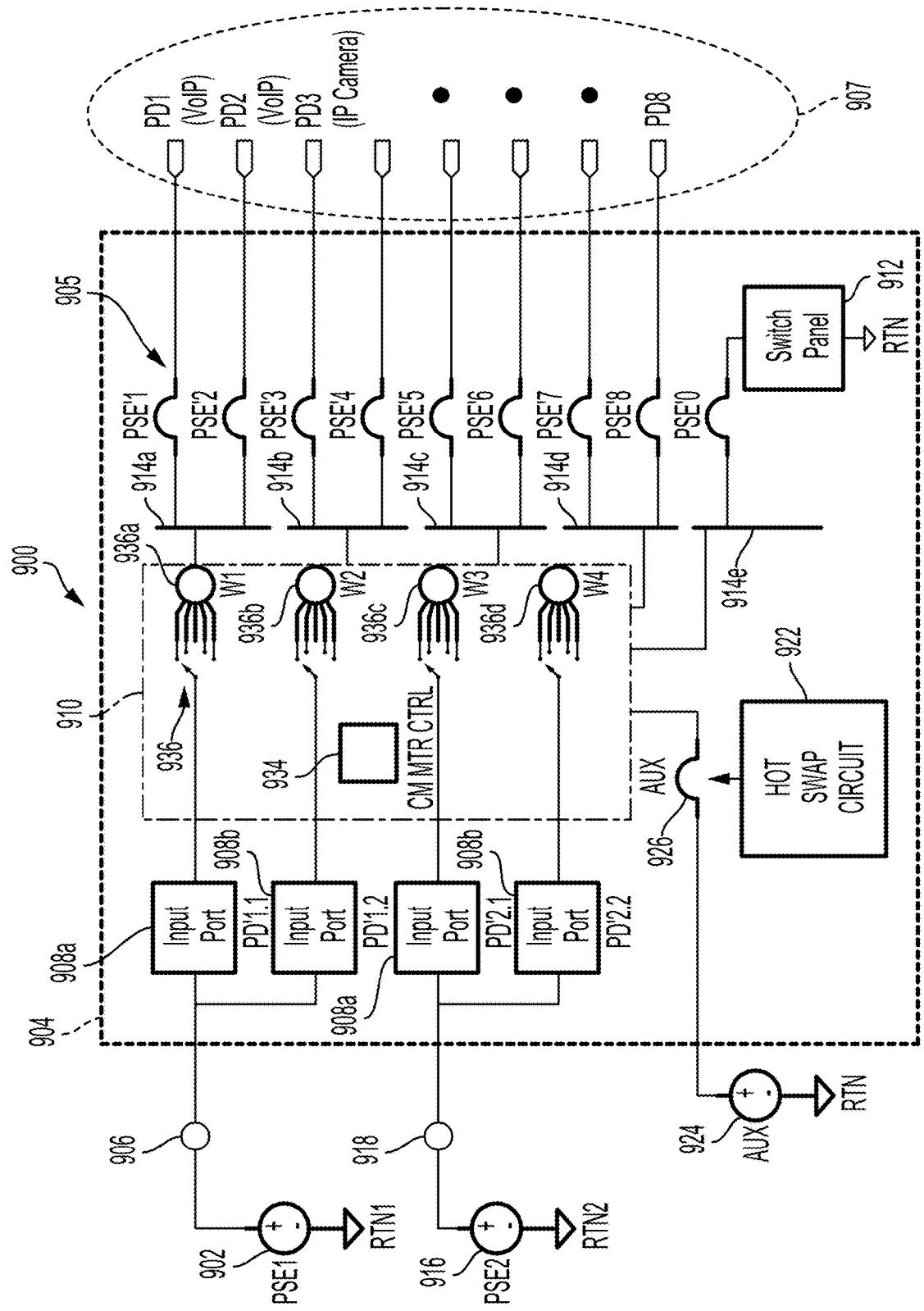
FIG. 9 shows an illustrative diagram of a power distribution system 900, in accordance with some embodiments of the disclosure.

In some cases, the embodiments of FIGS. 3-8 each employ double signature PDs. That is, the PDs of the set of PDs 307, 407, 507, 607, 707, and 807 of respective FIGS. 3-8, are double signature PDs as defined by Clause 33 of the IEEE 802.3 standard. A dual signature PD has independent detection and classification signatures and maintains power signatures on each pair set of the ethernet cable. In some embodiments, single signature PDs, as defined by Clause 33 of IEEE 802.3 standard may be employed. A single signature PD shares the same detection and classification signatures and maintains the power signature between the ethernet cable pair sets. The embodiment of FIG. 9 is based on single signature PDs. FIG. 9 shows an illustrative diagram of a power distribution system 900, in accordance with some embodiments of the disclosure. In some embodiments, system 900 is configured analogously to system 400, 500, 600, 700, 800 of FIGS. 4, 5, 6, 7, 8, respectively, with noted exceptions as provided below. System 900 is shown to include two PSEs, PSE1 902 and PSE2 916, an ethernet switch 904, and a set of PDs 907. PSE1 902, PSE2 916 and each of PDs 907 are PoE devices operating in conformance with the IEEE 802.3 power specifications. System 900 is further shown to include an auxiliary circuit including an auxiliary power source 924, a hot swap circuit 922, and an auxiliary switch 926, as described relative to the auxiliary circuits of FIGS. 5, 6, respectively, except as noted below. In some embodiments, auxiliary circuit of FIG. 9 functions analogously as the auxiliary circuits of FIGS. 5, 6, respectively. It is understood that while system 900 is shown to include two PSEs in FIG. 9, system 900 is not limited to two PSEs and may include more than 2 PSEs.

The PDs 907 are single signature PDs, accordingly, switch 904 is shown to include four input ports, 2 per PSE. More specifically, switch 904 includes input ports 908a and 908b shown coupled to PSE1 902, and input ports 920a and 920b shown coupled to PSE2 916. Switch 904 is further shown to include a controller 910, a switch panel 912, buses 914a-914e, and a set of output ports 905. In some embodiments, each of the output ports 905 includes a switch for selectively coupling a respective bus of busses 914a-914e to a corresponding PD of the set of PDs 907. The components of system 900 may be coupled and may operate analogously to the components of systems 400, 500, 600, 700, 800 of FIGS. 4, 5, 6, 7, 8, respectively as described above, except as discussed below and shown in FIG. 9.

Controller 910 of system 900 is shown to include a commutator 934 and a set of commutators 936 (936a-936d). The output of each of the commutators 936a-936d is coupled to a corresponding bus of busses 914a-914d, respectively. For example, the output of commutator 936a is shown coupled to bus 914a, the output of commutator 936b is shown coupled to bus 914b, the output of commutator 936c is shown coupled to bus 914c, and the output of commutator 936d is shown coupled to bus 914d. In some embodiments, auxiliary switch 926 is coupled to auxiliary source 924 on one side and to bus 914e on an opposite side.

In some embodiments, each of the commutators 936 may be brushless DC electric rotary switches or magnetic switches. Commutators 936 may be any switch device configurable and controllable to switch between various ports and operable at mid-level voltage ranges. Commutator control 934 may be configured to switch each of the commutators 936a-936d based on a selectable order of priority, for example. Switch 904 of system 900 is effectively a matrix of power switches (implemented by commutators) based on the switch connections with switch inputs to the port outputs based on selective encoding prioritization. In some embodiments, powering PSE'0 is given the highest priority. Powering output ports PSE'1 and PSE'2 may take on the next highest priority and so on. Power is distributed to the PDs 907 based on the load on switch 904 and PSE' prioritizations. The switch matrix approach of FIG. 9 is configurable to a design choice. For example, currently, two ports are shown coupled to each of the busses 914a-914d—ports PSE'1 and PSE'2 are shown coupled to bus 914a, ports PSE'3 and PSE'4 are shown coupled to bus 914b, ports PSE'5 and PSE'6 are shown coupled to bus 914c, and ports PSE'7 and PSE'8 are shown coupled to bus 914d. Each of the busses 914a-914d may have a different number of port couplings, switch 904 may have a fewer or a greater number of busses than busses 914, and a different order of priority may be assigned for powering the output ports PSE'1-PSE'8.

The configuration of switch 904 may be based, at least in part, on the amount of load from PDs 907. The loads may be grouped into as many different groupings as needed. For example, as previously noted, each group may include two output ports on a single, distinct bus in an embodiment with PDs 907 acting as larger loads compared to an embodiment with all 8 output ports grouped into two groups, each group including 4 ports and coupled onto a distinct bus with each of the PDs being a smaller load on each bus. In the embodiment of FIG. 9, no load sharing occurs because the loads are not combined with a single-provided PSE power. Instead, any excess power provided by PSE1 902 and PSE2 916 is provided to another commutator switch group. Partitioning of the output ports may be performed manually and may result in a non-integer number of ports. For example, in the case where the power wattage does not evenly divide into the number of ports, the excess power may be leftover, effectively a power loss. For instance, for Type 2 PDs powered by Type 4 PSEs, 30 watts are required, which is 2.36 ports, which is a non-integer number of ports leaving less than full utilization of the provisioned power. Accordingly, the embodiment of FIG. 9 may be economically inefficient.

Figure 10:
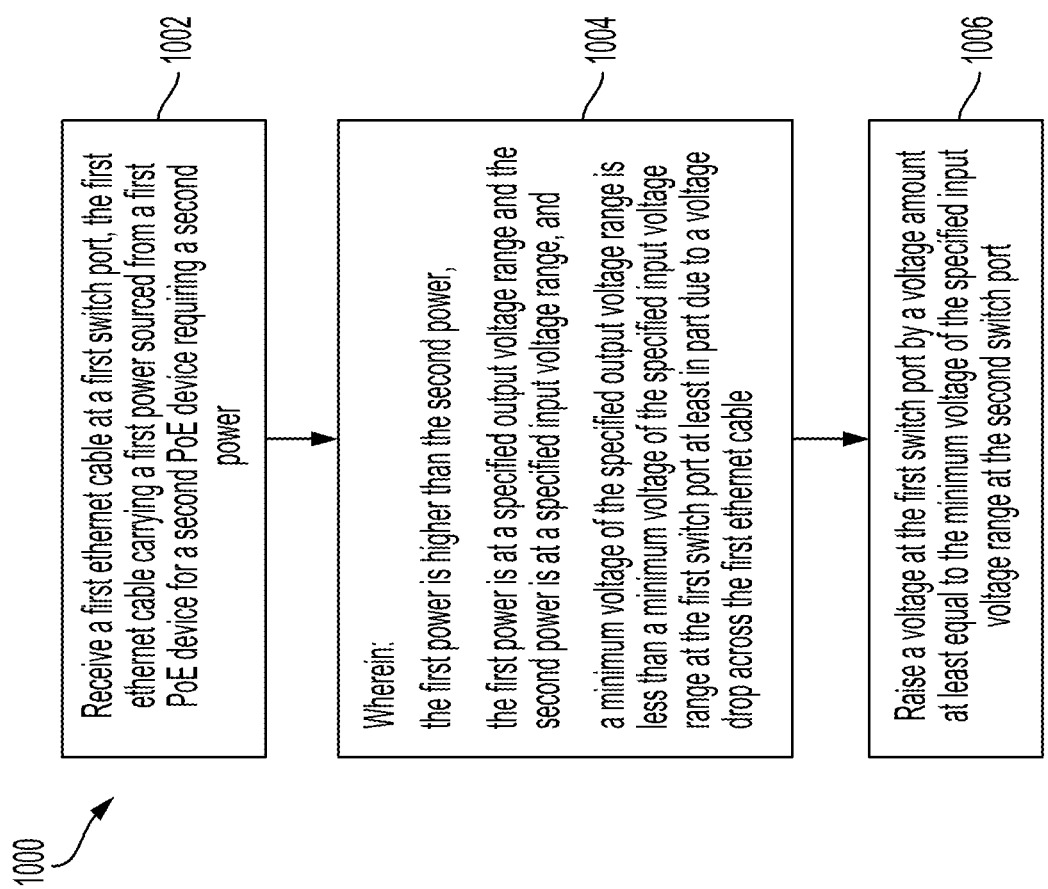
FIGS. 10-11 each shows a flowchart of an illustrative process for power distribution in a power distribution system, in accordance with some embodiments of the disclosure.
Figure 11:
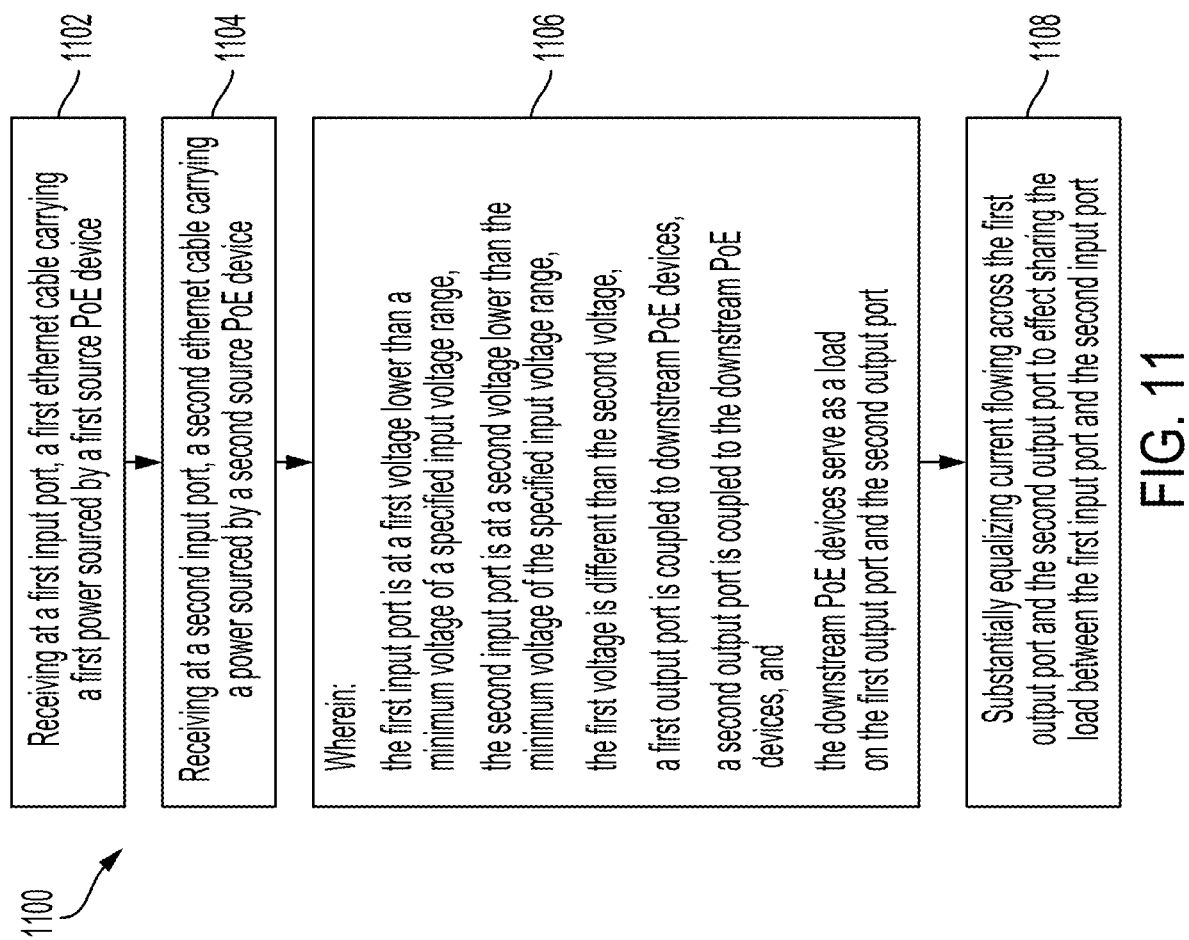

FIGS. 10 and 11 each shows a flowchart of an illustrative process 1000, 1100, respectively for power distribution, in accordance with some embodiments of the disclosure. In some embodiments, process 1000 may be implemented by system 300 of FIG. 3 and process 1100 may be implemented by systems 100, 200, and 400-900 of FIGS. 1, 2, and 4-9, respectively. Processes 1000 and 1100 may be implemented by systems other than the systems shown and discussed herein.

Process 1000 is now described with reference to system 300 of FIG. 3. At step 1002, switch 304 receives a first ethernet cable (e.g., cable 306) at a first switch port (e.g., input port 308). The first switch port carries a first power sourced from a first PoE device (e.g., PSE1 302) for powering a second PoE device (e.g., a PD of PDs 307) requiring a second power. As noted at 1004, in FIG. 10, the first power is presumed higher than the second power, for example, the first PoE device may be a Type 3 or Type 4 device and the second PoE device may be a Type 1 or Type 2 device. Further, the first power is at an IEEE 802.3 specified output voltage range and the second power may be at an IEEE-specified input voltage range. A minimum voltage of the specified output voltage range is less than a minimum voltage of the specified input voltage range at the first switch port at least in part due to a voltage drop across the first ethernet cable (e.g., cable 306). At step 1006, the voltage at the first switch port is raised by a voltage amount that is at least equal to the minimum voltage of the specified input voltage range at the second switch port. For example, assuming the first PoE device is a Type 3 PSE and the second PoE device is a Type 2 PD, controller 310 may raise the voltage at port 308 by at least 7V to provide a 7V-voltage boost to the voltage provided to PDs 307 to account for the voltage drop across cable 306.

Process 1100 is now described with reference to system 700 of FIG. 7. At step 1102, switch 704 receives, at a first input port (e.g., input port 708) a first ethernet cable (e.g., cable 706) carrying a first power sourced by a first source PoE device (e.g., PSE1 702). At step 1104, switch 704 receives, at a second input port (e.g., port 720), a second ethernet cable (e.g., cable 720) carrying a power sourced by a second source PoE device (e.g., 716). As indicated at 1106, in FIG. 11, the first input port is at a first voltage lower than a minimum voltage of a specified input voltage range, the second input port is at a second voltage lower than the minimum voltage of the specified input voltage range, and the first voltage is different than the second voltage. A first output port (e.g., output of switch 730) is coupled to downstream PoE devices (e.g., PDs 707), and a second output port (e.g., output of switch 732) is coupled to the downstream PoE devices, and the downstream PoE devices serve as a load on the first output port and the second output port.

At step 1108, current flowing across the first output port and the second output port is substantially equalized between the two output ports to facilitate effectively sharing the load between the first input port and the second input port.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A system for distributing power to a plurality of power-over-ethernet (PoE) devices, the system comprising:
   a switch including a first switch port and a second switch port and configured to:
      receive, at the first switch port, a first ethernet cable carrying a first power sourced by a first PoE device to be consumed by a plurality of downstream PoE devices, each requiring a respective second power, the first PoE device coupled to the plurality of downstream PoE devices through the switch at the second switch port,
      wherein:
         the first power is higher than a second power of at least one of the plurality of PoE devices,
         the first power is at a specified output voltage range and the second power of the at least one of the plurality of PoE devices is at a specified input voltage range, and
         a minimum voltage of the specified output voltage range is less than a minimum voltage of the specified input voltage range at the first switch port at least in part due to a voltage drop across the first ethernet cable; and
      raise a first switch port voltage to a voltage amount at least equal to the minimum voltage of the specified input voltage range at the second switch port.

2. The system of claim 1, wherein a second switch port voltage is substantially equally distributed to the plurality of downstream PoE devices.

3. The system of claim 1, wherein the first PoE device is a power sourcing equipment (PSE) of a first power type and the at least one of the plurality of downstream PoE devices is a powered device (PD) of a second power type and the first power type is higher than the second power type.

4. The system of claim 1, wherein the first PoE device and the plurality of downstream PoE devices are each IEEE-802.3 compliant.

5. The system of claim 4, wherein the switch is coupled to the plurality of downstream PoE devices through a second ethernet cable with a length to carry the second power from the switch to the plurality of downstream PoE devices in accordance with an IEEE-802.3 standard including a first voltage drop across the first ethernet cable and a second voltage drop across the second ethernet cable.

6. An ethernet switch comprising:
   a first input port coupled to a first ethernet cable carrying a first power sourced by a first source PoE device;
   a second input port coupled to a second ethernet cable carrying a power sourced by a second source PoE device, wherein the first input port is at a first voltage lower than a minimum voltage of a specified input voltage range and the second input port is at a second voltage lower than the minimum voltage of the specified input voltage range, and the first voltage is different than the second voltage;
   a first output port coupled to a first subset of a plurality of downstream PoE devices;
   a second output port coupled to a second subset of the plurality of downstream PoE devices, wherein the first subset of the plurality of downstream PoE devices and the second subset of the plurality of downstream PoE devices are a load on the first output port and the second output port; and
   a controller coupled to the first input port and the second input port and configured to substantially equalize current flowing across the first output port and the second output port such that the load between the first output port and the second output port is shared.

7. The ethernet switch of claim 6, wherein the controller is an attenuator configured to lower a greater of the first and the second voltages of the first input port and the second input port, respectively, to a voltage of one of the first and the second input ports that is the lower voltage to cause the current across the first output port and the second output port to be substantially equalized.

8. The ethernet switch of claim 6, wherein the controller dissipates a voltage substantially equal to a voltage difference between the first voltage and the second voltage.

9. The ethernet switch of claim 6, wherein the controller is further configured to regulate the first voltage and the second voltage to a substantially equal voltage.

10. The ethernet switch of claim 9, wherein the controller is further configured to raise the substantially equal voltage to at least the minimum voltage of the specified input voltage range at the first output port and the second output port.

11. The ethernet switch of claim 6, wherein the first power is higher than the second power.

12. The ethernet switch of claim 6, wherein the first source PoE device is of a first power type higher than a second power type of the plurality of downstream PoE devices and the second source PoE device is of the second power type.

13. The ethernet switch of claim 12, wherein the second power type is associated with the specified input voltage range and the first power type is associated with a specified output voltage range.

14. The ethernet switch of claim 6, further including a load sharing control device configured to balance a first load at the first output port with a second load at the second output port, wherein the first load and the second load collectively comprise a load associated with the plurality of downstream PoE devices.

15. The ethernet switch of claim 6, wherein the controller comprises a first voltage regulator coupled at the first output port and a second voltage regulator coupled at the second output port, the first and second voltage regulators configured to maintain a common voltage at the first output port and the second output port.

16. The ethernet switch of claim 6, wherein the first input port is substantially isolated from the second input port to prevent back current effects.

17. The ethernet switch of claim 6, wherein the first source PoE device is a first power sourcing equipment (PSE), the second source PoE device is a second PSE and the plurality of downstream PoE devices are each a powered device (PD).

18. The ethernet switch of claim 6, wherein the first source PoE device, the second PoE device, and the plurality of downstream PoE devices are each IEEE 802.3 compliant.

19. The ethernet switch of claim 6, wherein a length of the second ethernet cable is to carry the second power from the switch to the plurality of downstream PoE devices in accordance with an IEEE-802.3 standard despite a first voltage drop across the first ethernet cable and a second voltage drop across the second ethernet cable.

20. A method of power distribution by an ethernet switch, the method comprising:
   receiving at a first input port, a first ethernet cable carrying a first power sourced by a first source PoE device;
   receiving at a second input port, a second ethernet cable carrying a second power sourced by a second source PoE device,
   wherein:
      the first input port is at a first voltage lower than a minimum voltage of a specified input voltage range and the second input port is at a second voltage lower than the minimum voltage of the specified input voltage range, and the first voltage is different than the second voltage,
      a first output port is coupled to a first subset of a plurality of downstream PoE devices,
      a second output port is coupled to second subset of the plurality of downstream PoE devices, and
      the first subset of the plurality of downstream PoE devices and the second subset of the plurality of downstream PoE devices serve as a load on the first output port and the second output port; and
   substantially equalizing current flowing across the first output port and the second output port such that the load between the first input port and the second input port is shared.

* * * * *